US009904916B2

(12) United States Patent  (10) Patent No.: US 9,904,916 B2
Engström et al.  (45) Date of Patent: Feb. 27, 2018

(54) INCREMENTAL LOGIN AND AUTHENTICATION TO USER PORTAL WITHOUT USERNAME/PASSWORD

(71) Applicant: Klarna AB, Stockholm (SE)

(72) Inventors: Karl Petter Engström, Stockholm (SE); Daniel Lange, Stockholm (SE); Thomas Magnus Taylor Armstrong, Stockholm (SE)

(73) Assignee: Klarna AB, Stockholm (SE)

( * ) Notice: Subject to any disclaimer, the term of this patent is extended or adjusted under 35 U.S.C. 154(b) by 0 days.

(21) Appl. No.: 14/820,468

(22) Filed: Aug. 6, 2015

(65) Prior Publication Data

US 2017/0004582 A1    Jan. 5, 2017

Related U.S. Application Data

(60) Provisional application No. 62/187,620, filed on Jul. 1, 2015.

(51) Int. Cl.
*G07B 17/00* (2006.01)
*G06Q 20/14* (2012.01)
(Continued)

(52) U.S. Cl.
CPC ......... *G06Q 20/14* (2013.01); *G06F 3/04842* (2013.01); *G06F 17/30011* (2013.01);
(Continued)

(58) Field of Classification Search
CPC ..... G06Q 20/14; G06Q 40/12; G06F 3/04842
(Continued)

(56) References Cited

U.S. PATENT DOCUMENTS 6,029,193 A   2/2000  Yamamoto et al.
8,103,650 B1  1/2012  Kauchak et al.
(Continued)

FOREIGN PATENT DOCUMENTS

JP    2007-514333       5/2007
WO   WO 2011/097397    8/2011

OTHER PUBLICATIONS

International Preliminary Report on Patentability dated May 26, 2014 in International Application No. PCT/EP13/54529.
(Continued)

*Primary Examiner* — Rokib Masud
(74) *Attorney, Agent, or Firm* — Davis Wright Tremaine LLP

(57) ABSTRACT

A system and method comprising receiving a request to access a first set of details associated with a first transaction conducted by a user, the request including first information that corresponds to a first asset under the control of the user, determining an identity of the user based at least in part on the first information, and identifying a second transaction likely to be associated with the user, the second transaction being associated with second information that corresponds to a second asset different than the first asset. The system and method further including requesting confirmation from the user that the second asset is under the control of the user, and, upon receiving the confirmation, associating the first and second transactions with the first and second information.

20 Claims, 8 Drawing Sheets

(51) Int. Cl.
| | | |
|---|---|---|
| *G06F 17/30* | (2006.01) | |
| *G06Q 30/00* | (2012.01) | |
| *G06F 21/55* | (2013.01) | |
| *G06F 3/0484* | (2013.01) | |
| *G06Q 20/40* | (2012.01) | |
| *G06Q 40/02* | (2012.01) | |
| *G06Q 40/00* | (2012.01) | |
| *H04L 29/06* | (2006.01) | |

(52) U.S. Cl.
CPC .... *G06F 17/3053* (2013.01); *G06F 17/30867* (2013.01); *G06F 21/552* (2013.01); *G06Q 20/40* (2013.01); *G06Q 30/00* (2013.01); *G06Q 40/025* (2013.01); *G06Q 40/12* (2013.12); *H04L 63/08* (2013.01)

(58) Field of Classification Search
USPC .................................................. 705/26, 30
See application file for complete search history.

(56) References Cited

U.S. PATENT DOCUMENTS

| | | | |
|---|---|---|---|
| 8,494,897 | B1 | 7/2013 | Dawson |
| 8,606,696 | B1 | 12/2013 | Halpern |
| 8,818,910 | B1 | 8/2014 | Liu et al. |
| 9,092,516 | B2 | 7/2015 | Ilyas et al. |
| 2003/0014633 | A1 | 1/2003 | Gruber |
| 2003/0018636 | A1 | 1/2003 | Chi et al. |
| 2003/0163790 | A1 | 8/2003 | Murata |
| 2003/0167245 | A1 | 9/2003 | Murata |
| 2005/0021462 | A1 | 1/2005 | Teague et al. |
| 2005/0097040 | A1* | 5/2005 | Chen ............ G06Q 20/10 705/40 |
| 2005/0125338 | A1 | 6/2005 | Tidwell et al. |
| 2005/0166065 | A1 | 7/2005 | Eytchison et al. |
| 2008/0133407 | A1 | 6/2008 | Guillory et al. |
| 2009/0119182 | A1 | 5/2009 | Krstulich et al. |
| 2010/0042827 | A1 | 2/2010 | Pratt et al. |
| 2010/0293094 | A1 | 11/2010 | Kolkowitz et al. |
| 2011/0131122 | A1 | 6/2011 | Griffin et al. |
| 2011/0306368 | A1 | 12/2011 | McCarthy |
| 2011/0307381 | A1 | 12/2011 | Kim et al. |
| 2012/0204257 | A1 | 8/2012 | O'Connell et al. |
| 2013/0097157 | A1* | 4/2013 | Ng ............ G06F 17/30554 707/723 |
| 2013/0322709 | A1 | 12/2013 | Irani et al. |
| 2014/0074687 | A1 | 3/2014 | Halpern |
| 2014/0164218 | A1 | 6/2014 | Stewart |
| 2014/0207518 | A1 | 7/2014 | Kannan et al. |
| 2014/0229408 | A1 | 8/2014 | Vijayaraghavan et al. |
| 2014/0279299 | A1* | 9/2014 | Erenrich ......... G06F 17/30312 705/30 |
| 2014/0279509 | A1 | 9/2014 | Khilnani et al. |
| 2014/0280592 | A1 | 9/2014 | Zafarani et al. |
| 2015/0039292 | A1 | 2/2015 | Suleman et al. |
| 2015/0046302 | A1 | 2/2015 | Hu et al. |
| 2015/0121482 | A1* | 4/2015 | Berman ............. H04L 63/10 726/5 |
| 2015/0237039 | A1* | 8/2015 | Grajek ........... H04L 63/0815 726/8 |
| 2016/0034463 | A1 | 2/2016 | Brewer |
| 2016/0239837 | A1 | 8/2016 | Klingen et al. |

OTHER PUBLICATIONS

International Search Report dated Jun. 5, 2013 in International Application No. PCT/EP13/54529.
Written Opinion of the International Searching Authority dated Jun. 5, 2013 in International Application No. PCT/EP13/54529.
Notice of Grounds for Rejection (JP) dated Oct. 20, 2015, issued in corresponding Japanese Application No. 2014-560359.
Kim, W. and O. Jeong, "On Leveraging Social Web Sites," Innovative Computing, Information and Control (ICICIC), 2009 Fourth International Conference on, IEEE, Piscataway, NJ, Dec. 7, 2009, pp. 1273-1276.
Krishna Hari, K. Kokula and S. P. Rajan "A Clubbing of e-Commerce and Social Networking Sites," Ubiquitous Computing and Multimedia Applications (UCMA), 2011 International Conference on, Apr. 13-15, 2011, pp. 8-9.
Musiał, K. and P. Kazienko, "Social networks on the Internet," World Wide Web: Internet and Web Information Systems (WWW), Springer US, Jan. 26, 2012, pp. 31-72, 16:1, doi:10.1007/s11280-011-0155-z.

* cited by examiner

INCREMENTAL LOGIN AND AUTHENTICATION TO USER PORTAL WITHOUT USERNAME/PASSWORD

CROSS REFERENCE TO RELATED APPLICATION

This application claims priority from U.S. Provisional Application No. 62/187,620, filed on Jul. 1, 2015, entitled "INCREMENTAL LOGIN AND AUTHENTICATION TO USER PORTAL WITHOUT USERNAME/PASSWORD", the content of which, including Appendix A, is incorporated by reference herein in its entirety.

BACKGROUND

In order to make a purchase from an online merchant, a user is often required, or at least prompted, to create an account with the merchant. If the user wishes to view details about previous purchases, such as estimated delivery date, tracking numbers, date, and amount of purchase, and so on, the user is often required to login to the account using a username and password. However, user names and/or passwords may not be top-of-mind information; that is, user names and/or passwords may be difficult to remember, especially if the user has other accounts with other merchants or online services. Moreover, if the user loses or forgets either the username or password to the account, the process for regaining access to the account can be cumbersome. Furthermore, if the user forgets that he/she already has an account with the merchant, the user may end up creating duplicate accounts, but will only be able to access details about purchases associated with the particular account and not details of all purchases from the merchant made by the user. Additionally, if the user makes purchases from multiple merchants, the user must view details of the purchases separately at each of the merchants' website.

BRIEF DESCRIPTION OF THE DRAWINGS

Various embodiments in accordance with the present disclosure will be described with reference to the drawings, in which.

DETAILED DESCRIPTION

Figure 1:
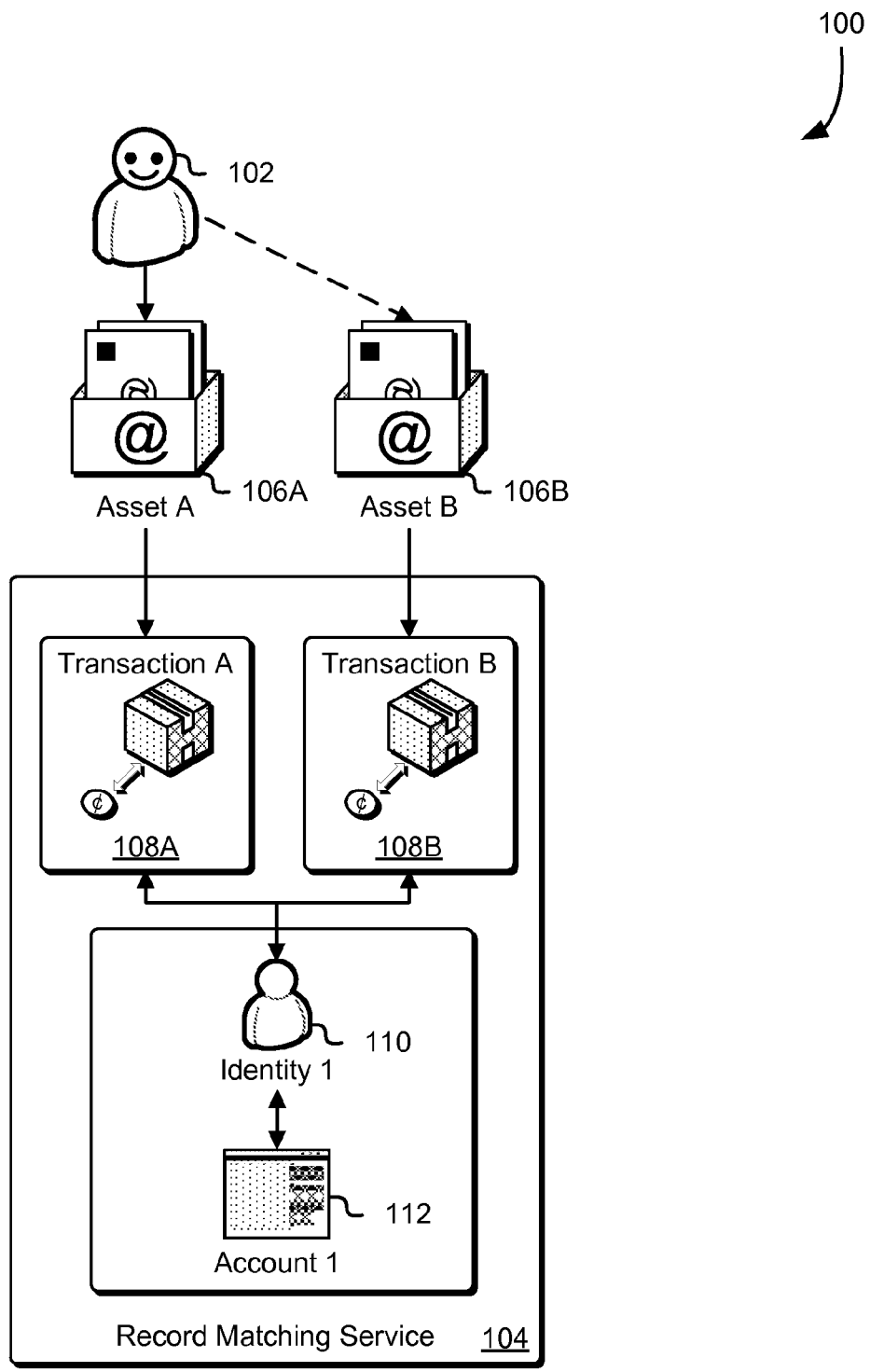
FIG. 1 illustrates an example of a user with two assets logging in with one of them in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method that receives requests from users to view details associated with a first transaction conducted by the user (e.g., a purchase of items or services from an online merchant via a browser). The request may be in the form of a user logging into a web interface using at least some information that corresponds to a first asset (first asset information) that is provable by the user to be under the control of the user. Examples of such assets may be mobile telephone or an email account, and the asset information corresponding to the asset may be a mobile telephone number or an email address. Information provided by the user at login may include other identifying information, such as a birthdate or a national identity number.

Based on the first asset information provided at login, the system of the present disclosure may be able to match transactions conducted by the user using such first asset information. The system of the present disclosure may also be able to identify other transactions appearing to be, as determined by the system, associated with the same user but being associated with information corresponding to a second asset (second asset information), different than the first asset. The system of the present disclosure may request confirmation that the second asset is also under the control of the user. Upon receiving confirmation from the user, both the first and the second asset information may be associated with a single identity by the system of the present disclosure. Consequently, both assets may be effectively associated with transactions made in conjunction with either asset, and logging in using either the first asset information or second asset information will allow the user to view details about transactions associated with either asset.

Techniques described and suggested in the present disclosure improve the field of computing, specifically the field of user authentication and security, by determining user identity and authenticity by confirming assets associated with transactions that are under the current control of the user and avoiding the use of complex passwords that may be insecurely protected or easily forgotten by users. Additionally, techniques described and suggested in the present disclosure improve the efficiency of computing systems by performing secure authentication without the need for managing sets of credentials. Moreover, techniques described and suggested in the present disclosure are necessarily rooted in computer technology in order to overcome problems specifically arising with usability of interfaces by determining an identity of the user only from a minimum amount of top-of-mind information input by the user.

FIG. 1 illustrates a scenario 100 of an embodiment of the present disclosure. Specifically, FIG. 1 depicts a user 102 who is conducting a first transaction 108A using first asset information 106A linked to an identity 110 of the user 102 that is associated with a user account 112, and a second transaction 108B associated with second asset information 106B also linked to the identity 110. In an example of an application of the present disclosure, the user 102 may visit an online merchant to make a purchase of one or more products offered for sale by the online merchant. The purchasing process may involve collecting information input by the user 102 (e.g., user name, email address, telephone number, country, billing address, delivery address, etc.) and information intrinsic to the first transaction 108A itself (e.g., item type, item price, item quantity, payment method, etc.). Additional information related to the first transaction 108A may also be collected, such as Internet protocol address of the device that the user is using to conduct the purchase, geolocation data (e.g., via a global positioning system about the user device), current date, and current time. In embodiments of the present disclosure, when a transaction is finalized, this information may be tied to the first transaction 108A (e.g., stored in a data store in association with the first transaction 108A). When a user seeks to log in to view details (e.g., an invoice, tracking information, total price, payment method, etc.) of the first transaction 108A later, the system may prompt the user 102 authenticate him/herself by inputting identifying information corresponding to an asset of the user, such as a telephone number or an email address that was input at the time of the first transaction 108A, and/or other identifying information (such as a birthdate or national identity number). The identifying information is intended to confirm that the user 102 seeking to view details about the first transaction 108A is actually the same user as the user who conducted the first transaction 108A. Such identifying information may include information corresponding to an asset of the user (also referred to as asset information).

In the present disclosure, the term, "asset," may refer to an item, account, or other tangible or intangible property, having identifying asset information, that can be proven to be under the control of the user 102. For example, an asset may be a telephone, an email account, a residence, a social media account, or other asset. The term, "asset information," may refer to data assigned to the specific tangible or intangible property (e.g., a device, an account, etc.) under the control of the user 102 that may operate as an address (or other reference information) indicating a location to which communications can be transmitted, or some other identifier usable to confirm that the asset is under the control of the user 102. For example, a telephone number may be a unique series of numbers assigned to a device owned by or under the control of the user 102. Likewise, an email address may be a unique string of characters assigned to an email mailbox owned by or under the control of the user 102. Examples of asset information may include information such as a telephone number, an email address, a residential address, a social media uniform resource locator (URL), and an OAuth token.

In the context of the present disclosure, assets may be confirmed, using the asset information, as being under the control of the user. Proving "control" of the asset in this context may involve acknowledging receipt and consumption of communications directed to the asset via the asset information. Confirmation that the user 102 entering the identifying information is the same user as a user who conducted the first transaction 108A may be obtained through a challenge-response authentication based on the identifying information. For example, a message (e.g., "Reply to this message to confirm," "Enter the following confirmation code on the website," etc.) may be sent to a respective telephone number or email address (i.e., asset information), and the user 102 may follow the instructions in the message to confirm that the user 102 has control of the asset. Although the present disclosure frequently refers to telephone numbers and email addresses as asset information, it is contemplated that other information could be used for verification. For example, a residential address could be considered asset information, in which case, a letter containing a confirmation code could be sent to the address by postal mail. Upon receiving and opening the letter, the user could enter the confirmation code into a screen of the merchant to confirm receipt of the letter at the specified address.

Although the present disclosure uses examples of telephone numbers and email addresses as the asset information 106A-06B, it is contemplated as within the scope of the present disclosure that other information owned by or under the control of the user 102 can be considered as an asset in this context. For example, an OAuth access token may also be an asset associated with a transaction. On the other hand, a given name, a family name, or even a combination of given name and a family name may not be considered to be an asset in the context of the present disclosure, because such names cannot be reliably and/or easily verified as belonging to the user 102 attempting to view transaction information. Even a national identification number, such as a Social Security number in the United States, may not be sufficient to act as an asset, because it is not easily provable as being under the control of the user 102, unlike a telephone number or an email address which may be verified as being under the control of the user 102 with little difficulty (e.g., by verifying receipt of a message sent to the respective number or address). Other examples of assets that may be associated with the transaction may include a residence or other building (e.g., verifiable by sending a confirmation code in a letter to a postal address), or a URL of a personal social media Internet page.

The record matching service 104 may be a record matching service for identifying users as users associated with other transactions based on occurrences of key details associated with a current transaction, of the type described within the Appendix A of U.S. Provisional Application No. 62/187,620, incorporated herein by reference, which are hereby incorporated herein by reference in their entirety. In this manner, the record matching service 104 is able to match users with their previous purchases without the need for cumbersome login and credential verification processes. For example, when the user 102 is identified by the record matching service 104 as likely to be a same user as a user associated with a second transaction 108B, based on key details associated with the first and second transactions 108A-08B, embodiments of the present disclosure may determine whether to allow the user 102 to view information about the second transaction 108B potentially associated with the user 102 (pending further confirmation).

That is, in order to confirm that the user 102 is not simply trying to impersonate a previous user in order to obtain details about the second transaction 108B, in some embodiments, the system of the present disclosure can prompt the user 102 for proof of ownership or control of the second asset information 106B provided with the second transaction 108B. For example, if the system of the present disclosure determines, based on a first email address provided by the user 102, that the user 102 may also be associated with the second transaction 108B conducted using a second email address the system may send a message to the second email address requesting validation that the current user owns or is in control of the second email address. Upon such confirmation, the system may then link/associate both the first and second email addresses with the identity of the user 102, such that in the future the user 102 can use either address as an asset to view previous transactions associated with either address.

In some embodiments, rather than automatically sending a message to the second email address, the user 102 may be prompted by the merchant website/interface with a message similar to, "Have you used this [alternate email address/ telephone number] for a previous transaction? If so, click here to validate," and, after clicking, a message may be sent to the second email address or telephone number for validation in the manner described above. In some embodiments, portions of the second email address or telephone number may be obfuscated as an additional security precaution. Note that the first and second asset need not be the same type of asset. For example, the user 102 may have used a telephone number as the second asset information 106 and be using an email address for the first asset information 106A, and upon confirmation, in a manner described above, that the first and second asset information 106A-06B are associated with the same user and they may be linked to the same user account.

The system of the present disclosure may be implemented as an automated payment system provided as a service to one or more merchants, such as through a software widget embedded into the merchants' online checkout web pages. One advantage provided by the system of the present disclosure is that the system may be used by multiple merchants, and, in this way, the user account 112 may be linked to transactions at all participating merchants without requiring the user 102 to create/register separate accounts with each merchant.

Another advantage provided by the system of the present disclosure is that separate transactions may be identified as being potentially associated with the same user merely from details of the first transaction 108A, and then the separate transactions may be linked to the same user account upon confirmation that they are indeed associated with the same user. Although it is contemplated that usernames and/or passwords may be additionally or alternatively utilized by embodiments of the present disclosure, in many embodiments, the user account 112 may be created as an account without recourse to a conventional process of establishing a shared secret (e.g., username/password) between the user and the service provider in order for the user to have administrative access to the account. Consequently, the user may be able to "log in," in this sense, to the user account 112 to view the user's transaction details by confirming control of an asset (e.g., an asset associated with the first asset 106A) associated with the transaction.

Confirming control of the asset, combined with, in some cases, any details associated with the session (e.g. Internet protocol address of the user device, any identifying information provided, geolocation data, etc.) may be used by embodiments of the present disclosure to determine, with sufficient certainty (e.g., confidence score exceeding a threshold) that the identity of the user attempting to access the user account 112 is the user authorized to access the account, that credential (e.g., username/password) verification may not be required (i.e., superfluous). In this way, the system of the present disclosure can avoid the complexity of managing one or more sets of credentials for each user, and improve security by avoiding the need for complex password requirements and passwords, which may be insecurely protected or easily forgotten by users. Furthermore, any details input by the user may simply be top-of-mind information (e.g., email address, telephone number, etc.) or information already associated with the transaction (e.g., items selected for purchase, payment method, etc.), thereby improving usability of the interface for the user.

In some implementations, proving access to a credential may be optional. That is, in some embodiments, the system may determine, based at least in part on certain criteria, that the user must prove access to a certain credential (e.g., password and/or username combination, fingerprint, gesture, retina scan, voice recognition, other biometric information, etc.) to log in to view details of a transaction. In some cases, such determination may be made if the certain criteria indicates that additional security or additional assurances as to the identity of the user are warranted (e.g., user is logging in from a device having a different Internet protocol address that has been previously used by user before, user is logging in from a public network or network determined by the system to be unsecured, predetermined threshold amount of time (e.g., 30 days), etc.) has passed since the user last logged on, etc.). In some implementations, the user may be logged in via a Federated authentication system provided by a Credential Service Provider. In some implementations, the user may be logged automatically without having to supply credentials or other personal information, as the system may recognize the user based on obtained information, such as the user's Internet protocol address, a HyperText Transfer Protocol cookie stored on the user device, and/or other information, such as browsing history, which may identify the user to the system with a satisfactory degree of certainty (i.e., likelihood that the user is correctly identified exceeds a threshold).

The user 102 may be an individual or some other entity authorized to conduct the first transaction 108A and view details about the first transaction 108A in accordance with permissions granted by the user account 112. Each of the first and second asset information 106A-06B may be an email address, telephone number, token, integrated circuit card identifier, or other information associated with an asset that can be confirmed as being owned by or under the control of the user 102. The first and second transactions 108A-08B may be any of a variety of transactions that may be conducted with the aid of an electronic device (e.g., personal computer, mobile phone, such as the computing device 800 of FIG. 8). Examples of such transactions include purchasing one or more items or services from an online merchant/vendor, selling one or more items or services through an online marketplace, making a purchase in a physical store or marketplace using the electronic device to finalize payment, and so on. As an example, the first transaction 108A may be a current purchase of a topcoat and a top hat by the user 102, who used an email address as the first asset information 106A when making the purchase, and the second transaction 108B may be a previous sale of black shades and white gloves by the user, who used a mobile phone number as the second asset information 106B.

In the scenario 100, the user 102 is in the process of conducting the first transaction 108A. During this process the record matching service 104 may determine that details associated with the first transaction 108A suggest that the second transaction 108B may also be associated with the user 102. Upon this determination, the record matching service 104 may send a message to the user 102 inquiring whether the user 102 also owns or is in control of the second asset. This message sent to the user 102 may include instructions or other information for verifying the second asset information 106B; for example, the message may be sent to the second asset and may include a temporary verification code that the user 102 can input as confirmation into a corresponding field in a user interface in communication with the record matching service 104. After the user 102 has been confirmed to be an owner of or otherwise in control of the second asset, the user 102 may be permitted by the record matching service 104 to view details about the second transaction 108B.

Once the record matching service 104 confirms that the user 102 is the same user associated with the second transaction 108B, the record matching service may link the first and second transactions 108A-08B to the same identity (the identity 110). The identity 110 may be a unique identifier used to link the user 102 with the user account 112. The user account 112 may be one or more records containing data about the user 102, such as name, address, username, password, and other profile information.

Figure 2:
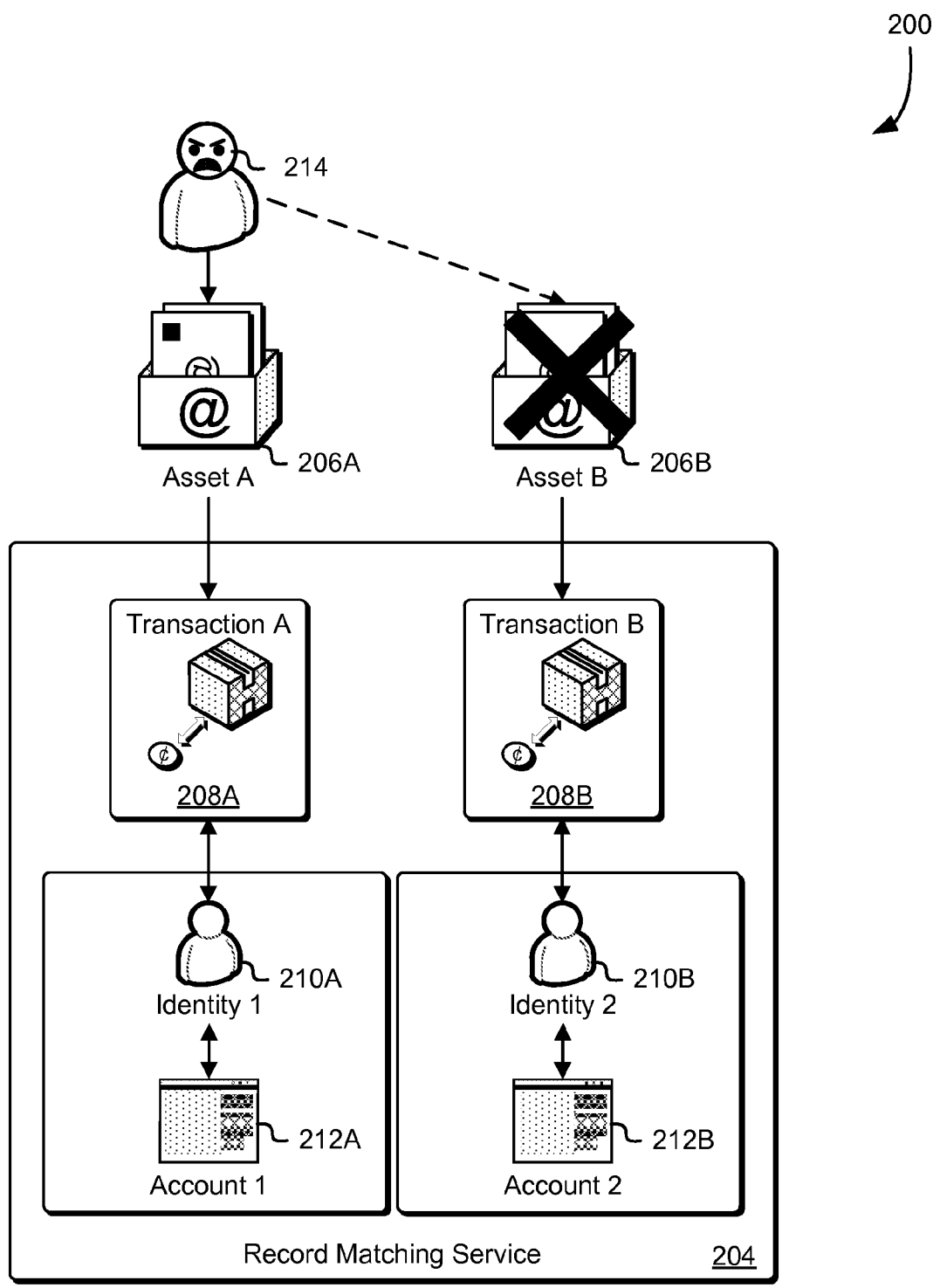
FIG. 2 illustrates an example of an unauthorized entity denied access to an account in accordance with an embodiment.

FIG. 2 illustrates a scenario 200 of an embodiment of the present disclosure. Specifically, FIG. 2 depicts an unauthorized entity attempting to access details of a second transaction 208B by performing a first transaction 208A using first asset information 206A in an attempt to impersonate a user associated with the second transaction 208B. The record matching service 204 may be a service such as the record matching service 104 of FIG. 1. The unauthorized entity 214 may be a user attempting to gain access to information to which the unauthorized entity 214 has insufficient permissions to access.

The first and second asset information 206A-06B may be information that can be readily proven to be owned by or under the control of an entity associated with a corresponding transaction, such as an email address or telephone number. An automobile vehicle identification number may be an example of data that is insufficient to operate as an asset in this context because, although it may be unique and assigned to a specific entity, it may not be readily proven (e.g., it does not provide a means to send/receive messages or other methods of confirmation) as being under the control of the entity associated with the transaction.

The first transaction 208A may be a purchase or a sale or some other type of transaction that the unauthorized entity 214 is conducting in an attempt to deceive the record matching service 204 into concluding that the unauthorized entity 214 is also associated with the second transaction 208B, which, in this scenario 200, is not the case. The second transaction 208 may be a purchase, sale, or any other transaction previously made by a different user than the unauthorized entity 214. The second transaction 208B was made in conjunction with the second asset information 206B, which, as can be seen in FIG. 2, is not under the control of the unauthorized entity 214. Because the unauthorized entity 214 does not have control of the second asset, the unauthorized entity 214 is forced to use a different asset, the first asset information 206A instead. As noted, the unauthorized entity 214 may have structured the first transaction 208A in an attempt to impersonate the user associated with the second transaction 208B. For example, the unauthorized entity 214 may have input the same given name, family name, and postcode as the user associated with the second transaction 208B, and may have even configured the user device to impersonate an Internet protocol address of the user associated with the second transaction 208B. Additionally, other transaction details of the first transaction 208A may be designed to be similar to the second transaction 208B; for example, if the unauthorized entity 214 is somehow aware that part of the second transaction 208B includes a particular game console, the first transaction 208A may include game media that is compatible with the particular game console. Taken as a whole, the record matching service 204 may conclude, in a manner described in Appendix A of U.S. Provisional Application No. 62/187,620, incorporated herein by reference, that the unauthorized entity 214 is likely the same user as associated with the second transaction 208B.

However, the system of the present disclosure may be configured to further confirm the identity of the unauthorized entity 214 before permitting the unauthorized entity 214 access to the details of the second transaction 208B. To this end, the unauthorized entity 214 may be prompted, as part of the transaction interface, to confirm whether the unauthorized entity is associated with the second asset. If the unauthorized entity 214 does not confirm control of the second asset, the unauthorized entity 214 will not be permitted to view details of the second transaction 208B, and furthermore, will not be linked to the identity associated with the second transaction 208B (the second identity 210B), and consequently be unable to access the second user account 212B. If the unauthorized entity 214 agrees to confirm control of the second asset, a confirmation message or code may be sent to the second asset that provides a way to confirm receipt of the message or code. However, because the unauthorized entity 214 in this scenario 200 is not in control of the second asset, the unauthorized entity 214 will not receive the confirmation message or code and consequently will not be able to confirm receipt of the message or code. Thus, the unauthorized entity 214 will again be thwarted and be unable to access details of the second transaction 208B or the second user account 212B. As a result, the unauthorized entity 214 will be viewed by the system of the present disclosure as having a separate identity than the user associated with the second transaction 208B, and the system may associate the unauthorized entity 214 with a separate identity (the first identity 210A) and account (the first account 212A), in isolation from the second identity 210B and the second user account 212B.

Figure 3:
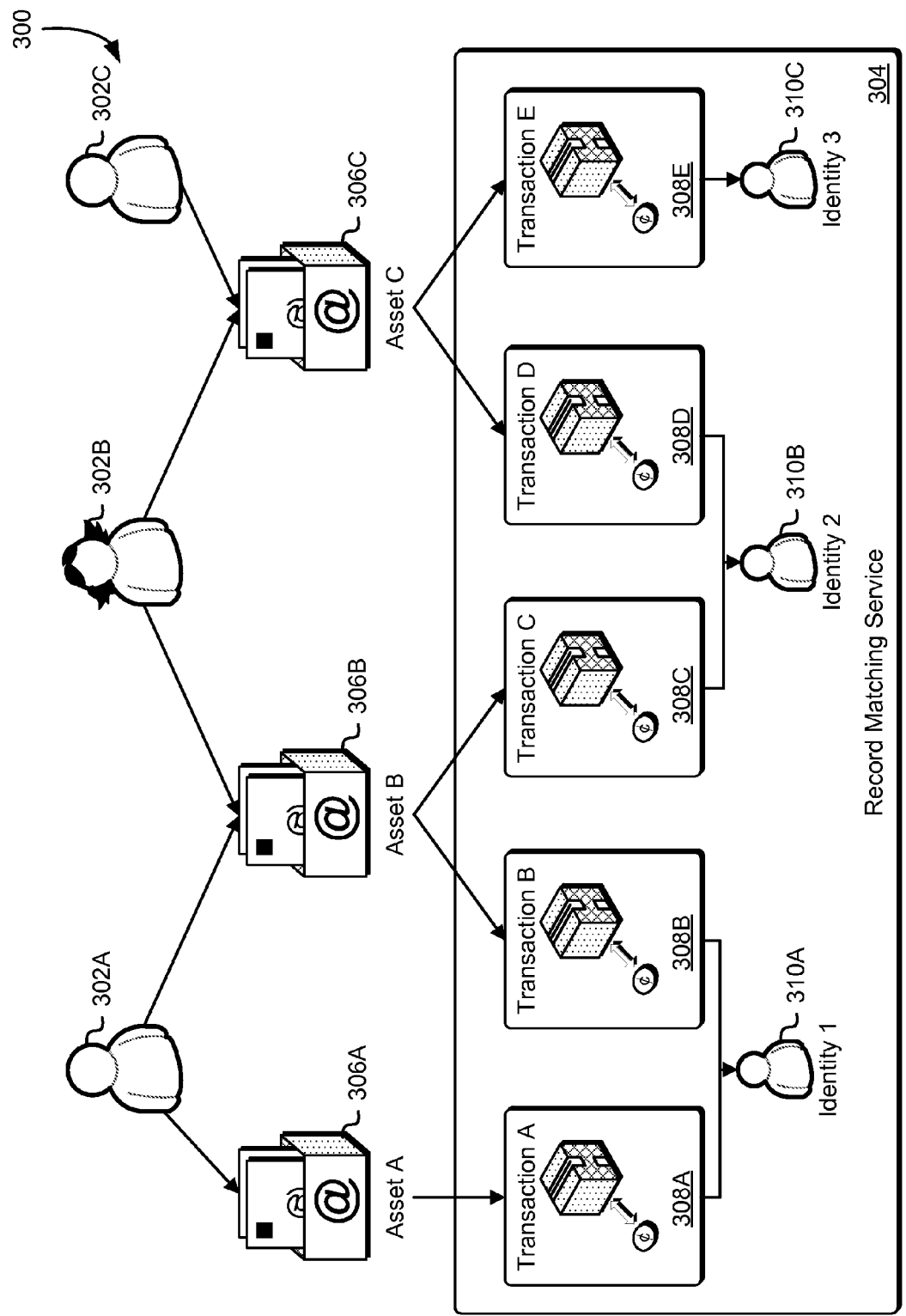
FIG. 3 illustrates an example of shared assets in accordance with an embodiment.

FIG. 3 illustrates a scenario 300 of an embodiment of the present disclosure. Specifically, FIG. 3 depicts the scenario 300 of a first user 302A who conducts a first transaction 308A using first asset information 306A and conducts a second transaction 308B using second asset information 306B that is shared with a second user 302B. The second user 302B conducts a third transaction 308C using the second asset information 306B and conducts a fourth transaction 308D using third asset information 306C that is shared with a third user 302C. The third user 302C conducts a fifth transaction 308E using the third asset information 306C. One of the functions of the record matching service 304 is to match the users 302A-02C to respective user identities 310A-10C.

The record matching service 304 may be a service such as the record matching service 104 of FIG. 1. The asset information 306A-06C may be asset information such as telephone numbers and email addresses under the control of respective users. The users 302A-02C may be any of a variety of individuals who conduct transactions in a manner described within the present disclosure. As can be seen in the scenario 300, the first asset information 306A is only assigned to the first user 302A. Transactions conducted by the first user 302A using the first asset information 306A can be readily identified and confirmed by the record matching service 304 as corresponding to the first identity 310A.

However, it can be seen that the second asset is shared by both the first user 302A and the second user 302B. For example, the first user 302A and the second user 302B may be a husband and a wife respectively sharing a family email address or mobile phone. As another example, the first asset information 306A may be a personal email address for the first user 302A; whereas the second asset information 306B may be a corporate email address shared among multiple users 302A-02B. The record matching service 304 has the task of determining which of the identities 310A-10B correspond to the transactions 308A-08C, and which details of which of the transactions 308A-08C to allow the users 302A-02C access to.

As can be seen in the scenario 300, the second transaction 308B and the third transaction 308C were conducted using the same asset information (the second asset information 306B). However, based on details associated with each of the transactions 308B-08C, the record matching service 304 has determined that it is likely that the transactions 308B-08C are not associated with the same user. Therefore, the second transaction 308B has been associated with the first identity 310A and the third transaction 308C has been associated with the second user identity 310B. Consequently, in some embodiments, a user who attempts to log into the record matching service 304 using the second asset information 306B, may only be allowed to view transaction details associated with the second asset information 306B.

In other embodiments, if the first user 302A logs into the record matching service 304 using the second asset information 306B and seeks to access details about the first transaction 308A, the system of the present disclosure will begin the process to confirm that the first user 302A is the user associated with the first transaction 308A by sending a confirmation message to the first asset associated with the first asset information 306A. Upon receiving the confirmation message, the first user 302A can confirm that the first asset associated with the first asset information 306A is under the control of the first user 302A (in one of the various ways described in the present disclosure), whereupon the system of the present disclosure can allow the first user 302A access to the details of the first transaction 308A. However, the second user 302B logging into the system using the second asset information 306B would be unable to access details about the first transaction 308A because the second user 302 would not be able to prove control of the first asset associated with the first asset information.

Likewise, if the first user 302A logging into the record matching service 304 using the first asset information 306A seeks to access details of the second transaction 308B, the system of the present disclosure may send a confirmation message to the second asset. However, if the second asset is currently under the control of the second user 302B, confirmation may not be received by the first user 302A. In such a situation, in order for the second transaction 308B to be associated with the first identity 310A of the first user 302A, the first user 302A may wait until the first user has control of the second asset. Upon confirmation that the second transaction 308B and the second asset information 306B are associated with the first user 302A, both the first and second transactions 308A-08B may be linked to the first identity 310A. In some implementations, if a user logs into the record matching service 304 seeking to view details regarding the second transaction 308B, because the second transaction 308B is tied to the first identity 310A of the first user 302A and because the record matching service has a data indicating that the first user 302A is also in possession of the first asset information 306A, the record matching service may send a confirmation to the first asset information 306A in order to confirm that the user is the first user 302A associated with the second transaction 308B, and not another user (e.g., the second user 302B).

In some embodiments, the record matching service will additionally or alternatively ask for additional identifying information from the user (e.g., national identity number, password, etc.) in order to confirm the identity of the user who logged in using the second asset information 306B. For example, if one of the users 302A-02B logs in using the second asset information 306B, before determining whether to show details of the second transaction 308B or the third transaction 308C, the system of the present disclosure may request certain information in order to determine the identity of the user, such as the national identity number. The system may be configured to prompt the user for types of information determined to have a high probability of distinguishing users (e.g., the first user 302A and the second user 302B) from each other, such as birthdate, middle name, name of a parent, item, or amount of a most recent previous transaction, etc. If the information corresponds to the first user 302A, the first user 302A will be able to access the details of the second transaction 308B, but will be unable to access details of the third transaction 308C. Similarly, if the information corresponds to the second user 302B, the second user 302B will be able to access details of third transaction 308C but unable to access details of the second transaction 308B.

In the unlikely event that an asset, such as the asset associated with the second asset information 306B, is mistakenly associated with the first identity 310A of the first user 302A, in some embodiments the system allows the first user 302A to correct the mistake. That is, the system may present a list of assets that it believes are associated with the first user 302A, and the first user 302A may be presented with an option to disassociate any asset not belonging to the first user 302A. Similarly, the fourth transaction 308D and the fifth transaction 308E were conducted using the same asset information (the third asset information 306C), but the record matching service 304 has determined that they were made by separate users, the second user 302B and the third user 302C respectively. That is, the third asset information 306C may be shared between both users 302B-02C. If the second user 302B logs into the record matching service using the third asset information 306C and seeks to view details regarding the third transaction 308C made using the second asset information 306B, the system of the present disclosure may send a confirmation to the second asset to ensure that the user attempting to view details about the third transaction 308C is the second user 302B and not some other user.

In some embodiments, during a transaction, if the system of the present disclosure is unable to match the transaction with a known user, the system may create a new user identity associated with the user. Thus, it is possible for the same user to have multiple user identities, and if the user logged in using an asset associated with one user identity, the user may be unable to access transactions associated with a different user identity even if the same user conducted the transaction. In this manner, the system of the present disclosure will err on the side of data protection. However, in some implementations, the system of the present disclosure may permit corrections to misidentified users. For example, if the second user 302B and 302C are actually the same user, the second user 302B may notify the system (e.g., through an application programming interface or remote procedure call) that details for certain transactions associated with the third asset information 306C (i.e., the fifth transaction 308E) appear to be missing when the second user 302B is logged into the system and viewing transactions. The system of the present disclosure may perform steps to confirm that the second user 302B is indeed the user associated with the fifth transaction 308E, and, upon successful confirmation, may merge the third identity 310C with the second user identity 310B to correct the misidentification.

In some embodiments, an interface for the users may allow the users to correct/merge misidentified identities. For example, the record matching service 304 may make a determination whether a user is the same user as a previous user based on probabilities determined by votes of a random forest of the supervised model exceeding a probability threshold. There may be situations where some transactions were close to the probability threshold but did not exceed the probability threshold. In those cases, when a user logs in, the system may present the user with a list of asset information or basic details of one or more transactions that approached the probability threshold, and the system may prompt the user to confirm or deny whether the user is associated with the particular asset or transaction. Upon confirmation, the misidentified identities may be merged with the user identity.

In some implementations, there may be a hierarchical relationship between users who share an asset for conducting transactions. For example, the second user 302B may be a parent of the first user 302A and the third user 302C. In these implementations, the system of the present disclosure may store information indicating that the second user 302B is also allowed to access transactions made using asset information shared by the second user 302B (e.g., the second asset information 306B and the third asset information 306C). In such implementations, the second user 302B may be able to view details about the second transaction 308B and the fourth transaction 308D even though the transactions were conducted by the first user 302A and the third user 302C, because the transactions 308B-08C were conducted using asset information indicated in the system as being owned by the second user 302B.

In some embodiments, the user identities 310A-10C reflect a determination that certain transactions have the appearance of being related and being associated with a particular user, and the user identities 310A-10C may not actually be associated with any identifier or similar data. Consequently the user identity 310A-10C may not be stored (e.g., in a data store) within the system, but may be generated at any time or generated on the fly whenever a user logs into the system to determine transactions associated with that user. In some cases, the record matching service 304 may determine that it has likely misidentified users as the same user. For example, if the first user and a second user are twins, data collected during initial transactions by each of the users may result in a determination by the record matching service 304 that the users are a single user. However, after the first user and/or the second user conduct one or more subsequent transactions, the record matching service 304 may determine that the users are actually distinct users. In this event, upon the next login by one of the users, the system may prompt the user for confirmation that certain of the transactions are actually not associated with the user who is logged in. Upon this confirmation, the system may then correctly assign the transactions to separate first and second users.

Figure 4:
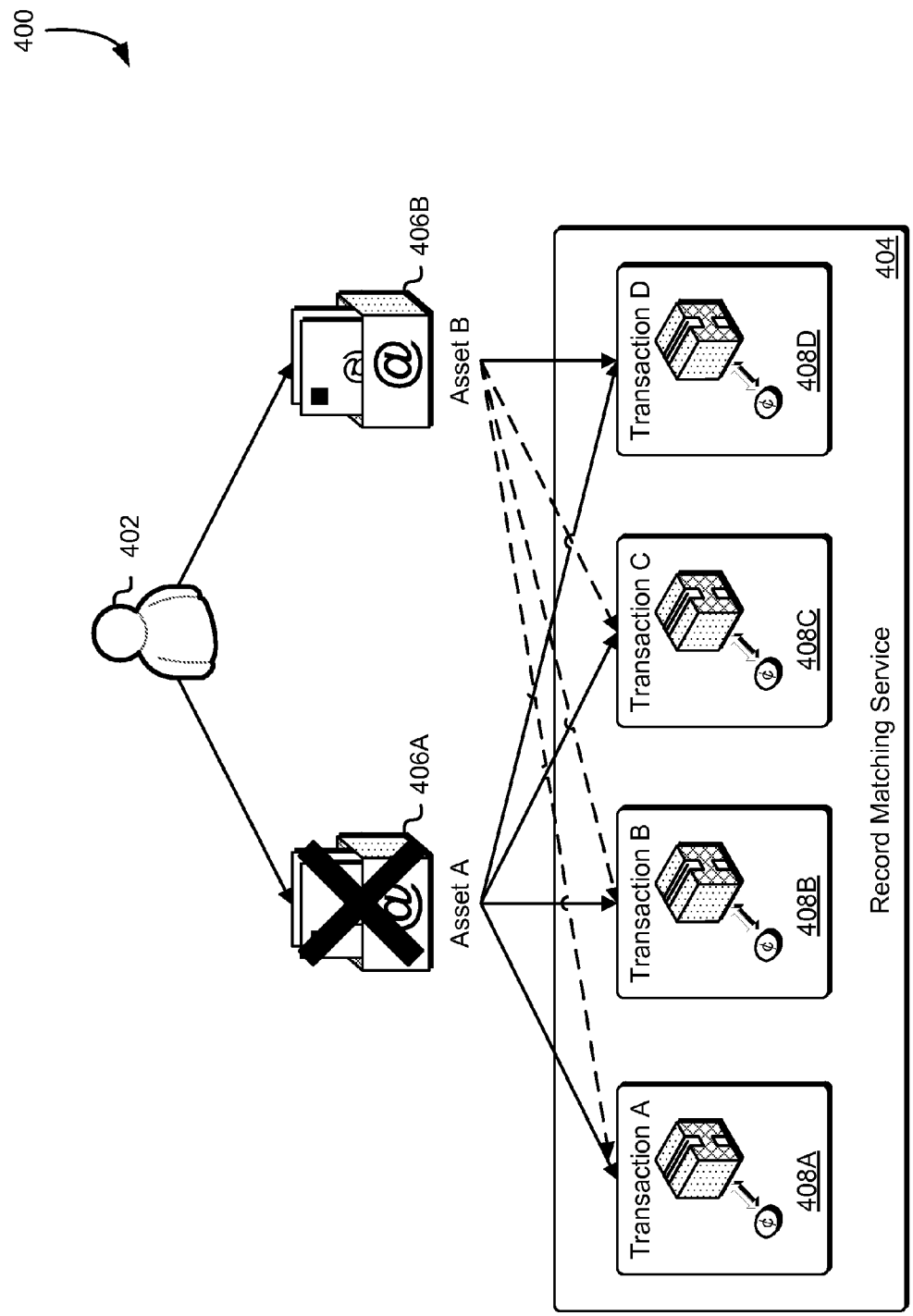
FIG. 4 illustrates an example of a user who has lost access to an asset in accordance with an embodiment.

FIG. 4 illustrates a scenario 400 of an embodiment of the present disclosure. Specifically, FIG. 4 depicts a user 402 who has conducted a first transaction 408A, a second transaction 408B, and a third transaction 408C using first asset information 406A, and conducted a fourth transaction 408D using second asset information 406B. In the scenario, the user 402 has lost access to the first asset. For example, the user 402 may have changed to a different Internet service provider and lost his email mailbox at that address (the first asset information 406A) as a consequence. As another example, the user 402 may have obtained a new mobile phone with a new number and no longer has access to the mobile phone with the old number (the first asset information 406A).

In such an example, the user may be unable to access the transactions 408A-08C without contacting a customer service representative with the ability to reassign the transactions 408A-08C to a new asset upon further confirmation of the identity of the user 402. However, if the fourth transaction 408D, conducted using the second asset information 406B, was conducted while the user 402 still had control of the first asset and was validated during the fourth transaction 408D, the system may automatically allow the user 402 to access any of the transactions 408A-08C, because both asset information 406B-06A were validated in a same session by the user 402 before the first asset was lost.

In some embodiments, where the first asset ends up in the hands of an unauthorized user (e.g., stolen, hacked, sold, etc.), the unauthorized user would be unable to view details about (i.e., denied access to) the transactions 408A-08D unless the unauthorized user had additional identifying information about the user 402 (e.g., national identity number, password, etc.). That is, logging into the system of the present disclosure may require more than just possession of an asset for authentication. Furthermore, the user 402, upon losing the first asset, may notify customer service or other administrative entity for the record matching service 404 about the loss, and upon verification of the identity of the user 402, the second asset 406 may be blocked (i.e., denied access to). That is, it may no longer be considered by the system as a valid asset for login and access. Alternatively, in some embodiments where logging in may require only asset information and top-of-mind information, an unauthorized user, with access to the asset knowledge of top-of-mind information of the valid used, may be able to log in, but may only be able to view details about transaction associated with the asset. Note, in some of these embodiments, successful and/or failed attempts to access details about transactions associated with a validated asset may cause a notification to be sent to one or more other validated assets of the user. In this manner, should an asset fall into the hands of an unauthorized user, the valid user may be promptly notified, via the user's other assets, of unauthorized access attempts using that asset. In some of these embodiments, the user may be able to customize the types of notifications (e.g., successful access, unsuccessful access attempt, etc.) should be sent to which of the user's assets.

Figure 5:
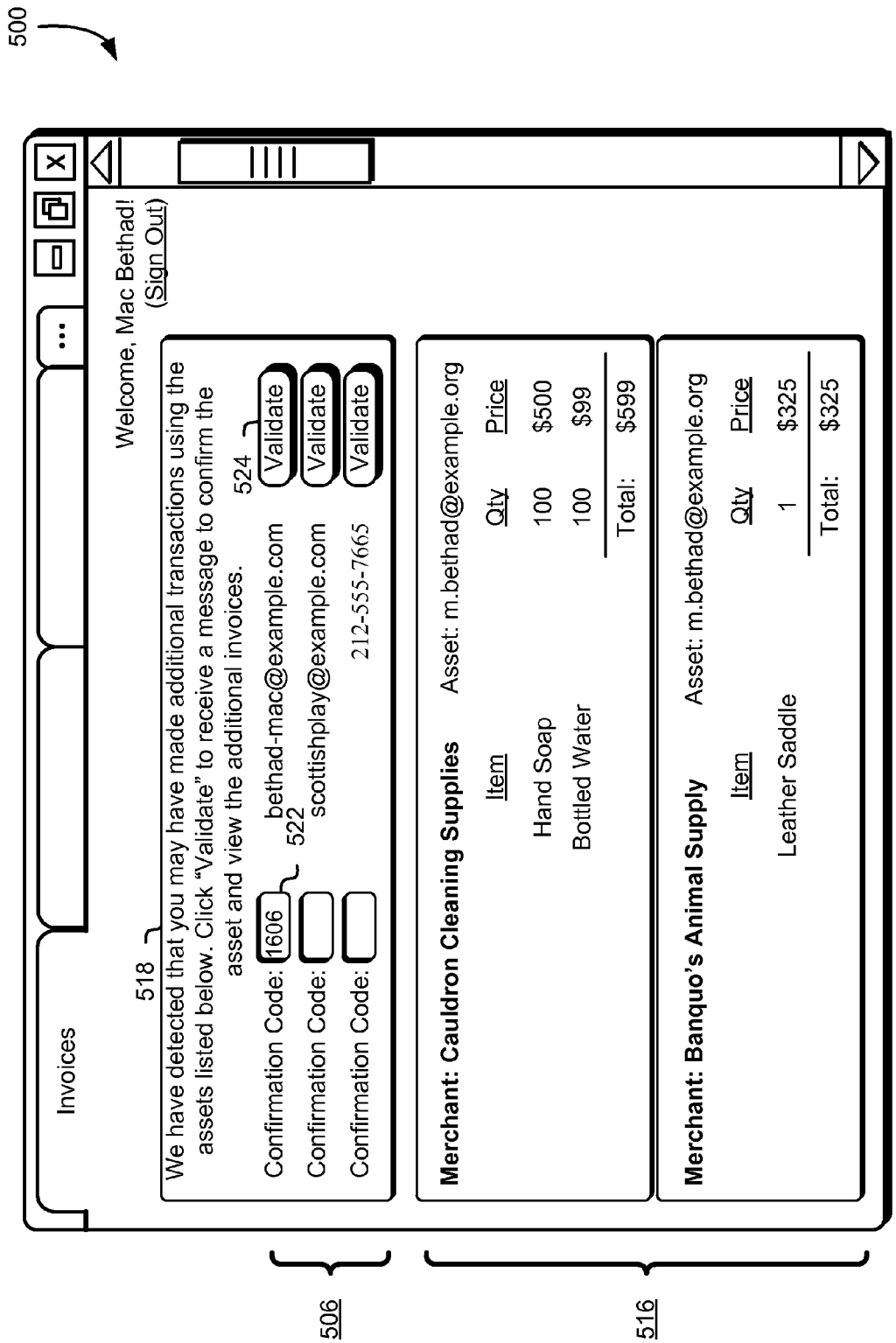
FIG. 5 illustrates an example of an invoice web page in accordance with an embodiment.

FIG. 5 illustrates an invoice interface 500 of an embodiment of the present disclosure. As illustrated in FIG. 5, the invoice interface 500, the interface includes sets of details 516 corresponding to previous purchases by the user ("Mac Bethad") that are associated with a first asset information ("m.bethad@example.org"), and a list of other assets 506 that have been determined by the system to likely be associated with the user. Note that the invoice interface may be a web interface, a mobile application interface, or any such interface configured for execution on a computing device such as the computing device 800 of FIG. 8. As shown in FIG. 5, the list of assets may be displayed in a message box 518 with at least one control 524 (e.g., "validate" button) for initiating a process for validating the asset information corresponding to the other assets. The message box 518 may also include at least one field 522 for entering in a confirmation code to confirm a corresponding asset. It is contemplated that a separate interface may be launched for inputting the confirmation code in response to triggering the at least one control 524. The other assets 506 may correspond to a telephone, an email inbox, or other asset under the control of the user. The set of details 516 may include invoices, and may include information such as asset information used when conducting the particular transaction, items transacted, quantity, price, total price, tracking information, and so on. Although FIG. 5 illustrates an invoice interface, it is contemplated that the invoice interface 500 may be alternatively an interface for different types of transactions other than purchases and other aspects of beyond invoices. For example, the invoice interface 500 may be a seller's interface for a user who sells items or services through an online marketplace, and may include details on items sold to customers, inventory purchased from suppliers, contracts executed, and other such transactions.

The set of details 516 may include content/details of transactions that are associated with a confirmed/validated asset of the user. In the example shown in FIG. 5, the set of details 516 show two invoices associated with a first asset of the user, the email destination at address "m.bethad@example.org." As an asset, such as a second asset, is confirmed as being under the control of the user, details of transactions associated with the newly-confirmed asset may be included in the set of details 516 and the invoice interface 500 may be updated to reflect/display the added details. In this manner, the assets for both the first (previously confirmed) asset and second (newly confirmed) may be simultaneously presented in the invoice interface 500. Note that "simultaneously presented" in this context does not necessarily indicate that content associated with both assets are concurrently or synchronously output to the interface, but rather that there is at least some duration of time where the content associated with both assets is present within the invoice interface 500.

In some embodiments, the system of the present disclosure may be used to confirm an identity of a user for separate transactions conducted with one or more merchants for the purpose of consolidating billing. That is, in example illustrated in FIG. 5, if the user validates the assets corresponding to "bethad-mac@example.com," "scottishplay@example.com," and "212-555-7665," the billing for transactions associated with those assets may be consolidated with the bills for "Cauldron Cleaning Supplies" and "Banquo's Animal Supply," by a billing system such that the user need only pay one bill to fulfill the payment obligations to all merchants associated with those transactions. In some embodiments, the invoice interface 500 may allow the user to input and verify new assets to be associated with the transactions. For example, if a user is replacing an old email address with a new email address, or has an alternate email address, the user may enter the new/alternate email address into a corresponding field (not shown) in the invoice interface 500, and the system may associate the new/alternate email account with the transactions upon successful execution of a confirmation workflow for the new/alternate asset.

As noted in the present disclosure, in some implementations, a user may deny association with some transactions associated with an asset. For example, a husband, who shares an asset with a wife, may deny being associated with transactions made by the wife (e.g., through a control on the interface). In such a case, the details of denied transactions may be removed from the set of details, and the invoice interface 500 may be updated to remove the invoices.

The message box 518 may also include controls (not shown) for the user to indicate assets that are not associated with the user. For example, if the user does not recognize the phone number "212-555-7665," the user may click a control to notify the system that the asset has been mistakenly associated with the user by the system and does not actually belong to the user. The system of the present disclosure may then disassociate that asset from the identity of the user by updating one or more tables of a database (e.g., for example, assigning a new user identifier to the transaction or transactions associated with the asset, associating the asset with the next most-likely user, as determined by a supervised model of embodiments of Appendix A of U.S. Provisional Application No. 62/187,620, incorporated herein by reference, or by setting flag on a field in an asset confirmation table of a database that indicates that the asset has been denied by the user), and the asset may subsequently may no longer be listed in the invoice interface 500 as an asset to validate.

Confirmation of assets and denial of assets by users as described in the present disclosure may provide data for training the random forest of the supervised model so that it can make improve the accuracy of its determinations of user identities. As described in detail in the embodiments of Appendix A of U.S. Provisional Application No. 62/187,620, some supervised models may be configured to determine whether two or more transactions should be associated with the same user identity, based on details associated with the transactions (e.g., given name, family name, address, Internet protocol address, birthdate, date/time of purchase, total price of the purchase, etc.). The random forests of the supervised models may have been trained using historical records of past transactions having at least one ground truth value. As explained in Appendix A of U.S. Provisional Application No. 62/187,620, a "ground truth value" may refer to a value that unambiguously corresponds to a target value/objective, which in this case may be an identity of the user. In the present disclosure, upon confirmation of an asset by a user associated with a particular user identity, the user identity can be considered a ground truth value because the user has unambiguously confirmed that the user identity corresponds to the user. This ground truth value and associated data may be subsequently utilized to update/retrain the supervised model so that, over time, the accuracy of the supervised model improves.

Similarly, when an asset is denied by a user (i.e., the user indicates the user is not associated with the asset), this too provides data that may be used to improve the accuracy of the supervised model. For example, transactions associated with this asset may be re-assigned to the next most likely user, and upon confirmation by that user, ground truth may be considered to be established and the supervised model can be updated/retrained with the new ground truth value. Alternatively, if transactions corresponding to the asset were previously used to update the supervised model (i.e., if the system incorrectly assumed that ground truth had been established for those transactions), upon denial of the asset by the user, those transactions may be disassociated from the user and may be disregarded when the supervised model is retrained/updated.

In some implementations, an interface such as the invoice interface 500 may allow the user to confirm or deny/disavow transactions in addition to or alternative to assets. For example, in a situation where multiple users share the same asset (e.g., husband and wife), such as the asset 306B of FIG. 3 shared by users 302A-02B, a first user 302A may notice that one or more transactions (e.g., the second transaction 308B) have been mistakenly associated with the first user identity 310A, when in actuality, the one or more transactions should be associated with the second user 302B (i.e., the second user identity 310B). The first user 302A, using functionality provided in an interface, may notify the system that the transaction should not be associated with the first user identity 310A. In response to receiving the notification, the system may disassociate the second transaction 308B from the first user identity 310A. In some cases, the system may update the association of the second transaction 308B to be associated with the second user identity 310B. In some of these cases, the system may prompt the second user 302B to confirm that the second transaction 308B should indeed be associated with the second user 302B before making that association. In any case, ground truth values for the transaction data corresponding to the second transaction 308B may be changed, and consequently the supervised model may be updated/retrained using the changed transaction data in a manner described above in order to improve the accuracy of the supervised model.

The supervised model may be updated/retrained regularly (e.g., nightly, weekly, monthly) or irregularly from transaction data where ground truth has been established in a manner described above. That is, in addition to or alternative to the original historical data used to train the random forest of the supervised model, the random forest include data collected from transactions conducted by embodiments of the systems of Appendix A of U.S. Provisional Application No. 62/187,620, incorporated herein by reference, and by feedback received from users of the system of the present disclosure that unambiguously connect assets and/or transactions to a particular user identity.

Figure 6:
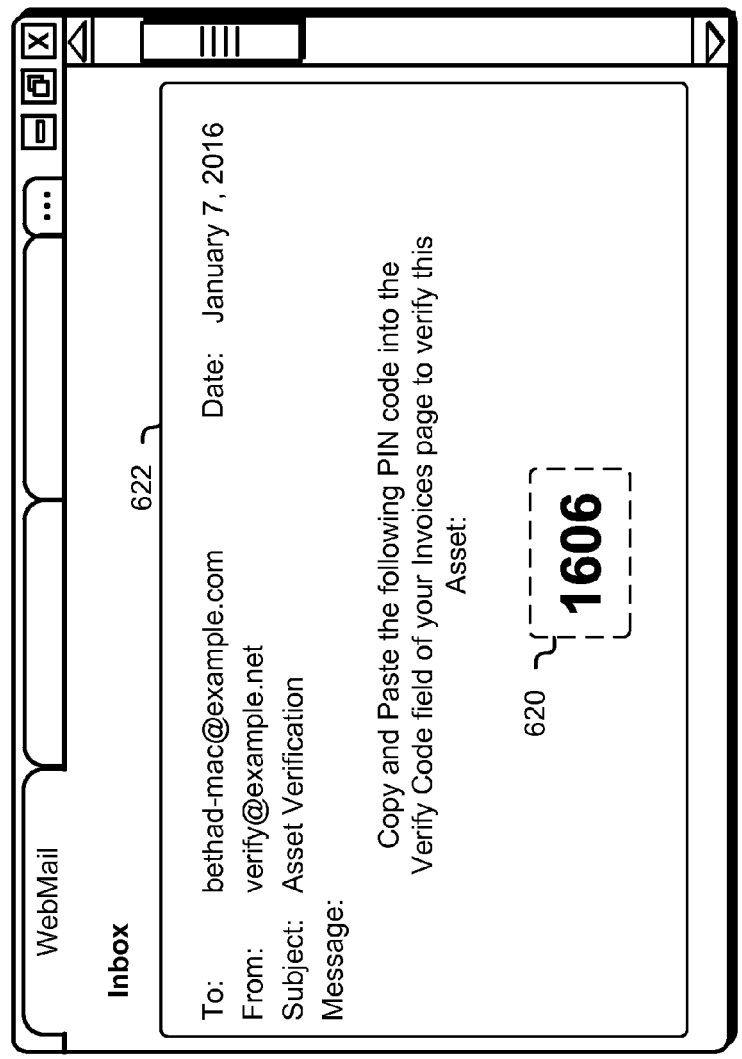
FIG. 6 illustrates an example of a confirmation message in accordance with an embodiment.

FIG. 6 illustrates an email interface 600 with an inbox containing a confirmation email message 622 received by a user in order to confirm an asset under the control of the user. In particular, the confirmation email message 622 has been sent to the email address given by the asset information (bethad-mac@example.com). The email message includes a confirmation code of "1606," which the user may subsequently input into a field such as the at least one field 522 of an interface similar to the invoice interface 500 of FIG. 5 to prove that the user has control of the email mailbox corresponding to that address. The confirmation code in the confirmation email message 622 may be configured to expire after a certain time in order to reduce the risk of unauthorized access to the email mailbox. Furthermore, other methods of confirmation control of the asset are also contemplated; for example, the confirmation email message 622 may contain a link with the session key that, when activated, automatically opens a browser window and confirms the receipt of the confirmation email message 622. As noted, the asset need not necessarily be an email mailbox, and in the case where the asset is a mobile telephone, rather than the confirmation email message 622, a confirmation text message may be sent to the user with a similar type of confirmation code. Likewise, the confirmation code may expire after a certain time period. In an event where the asset information is a geographical address, the confirmation message with the confirmation code may be sent by postal mail.

Figure 7:
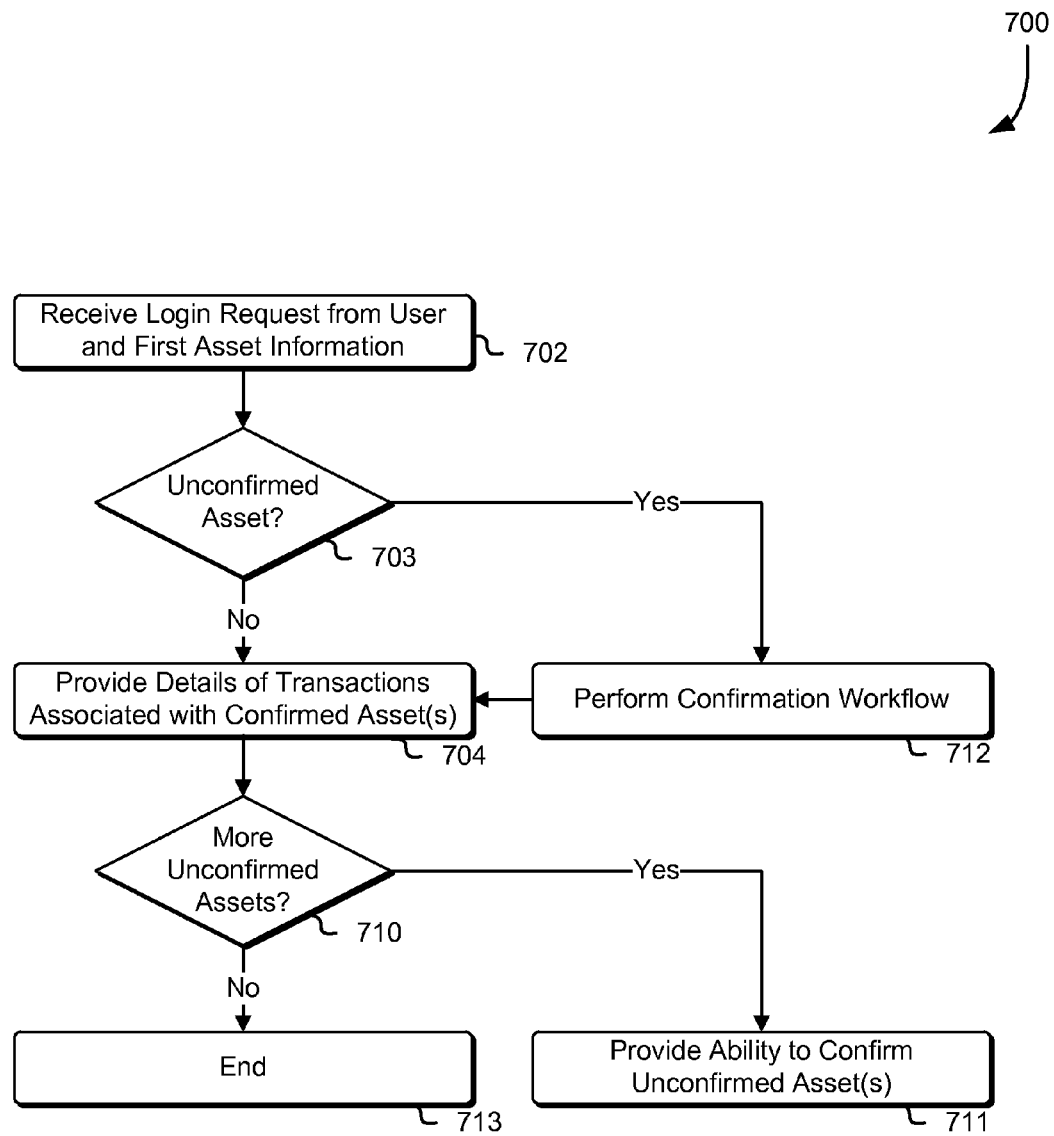
FIG. 7 is a flowchart that illustrates an example of asset verification in accordance with an embodiment.

FIG. 7 is a flowchart illustrating an example of a process 700 for confirming an asset in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. For example, some or all of process 700 may be performed by any suitable system, such as the computing device 800 of FIG. 8. The executable instructions and/or other data may be stored on a non-transitory computer-readable storage medium (e.g., a computer program persistently stored on magnetic, optical, or flash media).

In 702, the system performing the process 700 may receive a login request from a user wishing to view details of a previously conducted transaction, such as an invoice for a purchase of one or more items or services from an online merchant website. The login request may be submitted as a result of interaction with the website or other user interface and may be, for instance, a HyperText Transfer Protocol request or other electronic request submitted by a computer system that displays the user interface. The login request may include asset information corresponding to a first asset, such as an email address corresponding to an email mailbox or a telephone number corresponding to a mobile telephone. The asset information corresponding to the first asset, in some cases, may be the asset information that was input by the user at the time the transaction was conducted. In other cases, the asset information may be asset information that was confirmed as being associated with an asset under the control of the user according to the confirmation workflow of 712 (below). As noted above, examples of asset information include email addresses, telephone numbers, and may further include information such as geographical addresses, retina scans, fingerprints, and other biometric information. The login request may also include additional information that at least partially authenticates the user thereby indicating the likelihood that the user logging in is indeed the user that corresponds to the asset information, and not an unauthorized entity attempting to impersonate the user. For example, the user may make the login request also providing, into a website form or other user interface (e.g., mobile application) information such as a birthdate, a national identity number, password, a maiden name of the user's mother, name of the street the user grew up on, or some other information unlikely to be known by entities other than the user, and stored by the system for use in confirming identity of the user.

Further included in the operations of 702 are obtaining a user identifier for the user based on information provided with the request. In some implementations, the user identifier may be obtained by querying a database for a user identifier associated with identifying information provided with the request (e.g., national identity number, password, fingerprint, etc.). In other implementations, the user identifier may be obtained by passing information received in the request through a supervised model similar to the supervised model described in the Appendix A of U.S. Provisional Application No. 62/187,620, incorporated herein by reference, and receiving, as output, the user identifier that is determined to be likely associated with the user. In still other implementations, the user identifier may be obtained by querying a transaction database based on information provided with the request, such as the asset information. For example, the query may be a query to obtain a distinct user identifier associated with the particular email address passed as the asset information with the request. It is contemplated that there may be other methods of obtaining a user identifier in response to the request. Note that if the user identifier is unable to be obtained (e.g., no record returned from the query to obtain the distinct user identifier because no user identifiers were able to be matched to information that was received with the request and/or information received with the request was unable to be matched to a user matching with a high enough confidence score, as determined by a supervised model of the system of Appendix A of U.S. Provisional Application No. 62/187,620 or the present disclosure), the system may determine that it is likely an attempt by an unauthorized user to log in as the legitimate user, and in such a case the system may terminate the process, or perform other security measures, and not proceed to the next operation.

In the context of the process 700, "querying" may refer to a structured query language (SQL) query, some other database query, an application programming interface request (e.g., a web service request) to a service that vends such data, or some other method of obtaining data from a data store. The database may be an organized collection of data, such as tables, stored procedures, reports, views, and other database objects. Note that any structure configured to store and retrieve data in the manner described may be used, including file systems, relational databases, non-relational databases, object-oriented databases, comma delimited files, and other files. In some implementations, the structure may be a distributed data store.

Note that the user identifier may have been generated by a supervised model in accordance with an embodiment of the system of Appendix A of U.S. Provisional Application No. 62/187,620, incorporated herein by reference. For example, during the course of executing or recording the transaction, a record matching service of the system of Appendix A of U.S. Provisional Application No. 62/187,620 may determine, based on details (which may include asset information) associated with the transaction, whether the transaction is a first transaction conducted by the user, or whether the user is the same as a user associated with one or more previous transactions, based on stored details about the previous transactions. The determination may be made by a likelihood/probability of the user being the same, as determined from votes of a random forest of a supervised model, exceeding a threshold (e.g., 90%). If the likelihood does not exceed the threshold, the system may consider the user to be a new user of the system and create a new identity for the user. However, if the user is determined likely to be the same user, the new transaction may be associated with an identity shared by the one or more previous transactions. Note that, determining transactions associated with the same user may be performed asynchronously relative to the performance of the process 700, and may occur over time as the user engages in transactions at various times, perhaps with different merchants. For instance, each time the user engages in a transaction involving an online payment system, the online payment system may determine that the transaction is associated with the user and store the transaction in association with the user (e.g., by associating the transaction with an identifier of the user) in a database. Furthermore, asset information (e.g., email address, telephone number, etc.) may also be stored with the transaction in association with the user.

In 703, the system performing the process 700 may determine whether the asset associated with the first asset information (i.e., the asset information provided by the user in the login request of 702) has been confirmed as being under the control of the user. In other words, the system may determine whether this is the first time that the user has attempted to log in using the first asset information. Note that embodiments of the present disclosure may be implemented in a distributed computing environment, thus it is contemplated that in some implementations, the system receiving the request may be a different system than the system making the determination whether the asset has been confirmed. For example, the system performing the process 700 may make an application programming interface call to a backend server or service requesting the determination, which, in return, may make the determination and provide the result to the system performing the process 700. Note too, in some implementations, confirmation of the first asset information in accordance with the confirmation workflow of 712 may not be performed on initial login to verify the first asset, because the system may presume, based on information provided with the login information in 702, that the first asset is already under the control of the user. In other implementations, confirmation in accordance with the confirmation workflow of 712 of the first asset information may be performed each time the user logs in with that asset information. In some embodiments, the request to log in may itself include information confirming ownership of an asset, such as if the request includes biometric information or if the user interface collects such information before the request is submitted to the system performing the process 700.

In some implementations of the present disclosure, a database table ("confirmation table") with at least fields for a user identifier and asset information or asset identifier may be present for storing whether assets are confirmed or not. In some cases, the table may include additional fields, such as fields for asset type, confirmation status, and so on. In some cases, if the user has not previously logged in with an asset, the user may not yet have an entry in the confirmation table. Thus, upon initial login by the user, the system performing the process 700 may execute a query on the confirmation table to determine whether the first asset has already been confirmed (i.e., information in the confirmation table associated with the first asset information indicating that the asset has been confirmed) in association with the identity of user logging in (e.g., in some cases, this may simply be an entry of the asset information in the confirmation table in association with the user identifier associated with the user, in other cases this may include a check of a confirmation status field in the confirmation table associated with the asset information and an identifier associated with the user, etc.). As noted above, it is contemplated that embodiments of the present disclosure may be implemented in a distributed computing environment; e.g., some portions of the process 700 may be performed by a web server while other portions of the process 700 may be performed by one or more database servers. Thus, the query in some implementations may be performed by a different system than the system that received the request of 702. For example, the system performing the process 700 may make an application programming interface call requesting the query to a backend server or service, which, in return, may make the perform the query and provide records returned to the system performing the process 700.

Thus, if the query returns no records or if the query returns a confirmation status of unconfirmed, the system performing the process may proceed to 712. Otherwise, if the first asset has been determined to be confirmed, the system performing the process may proceed to 704. In 704, the system may query the confirmation table to obtain a set of records containing asset information of confirmed assets. As noted above, in some implementations the query may be performed by a separate system (e.g., database server, or some other backend server or service). Note that in some implementations, this list of asset information may have already been obtained when the confirmation table was queried in 703. For example, the confirmation table was queried in 703 against the user identifier, and a set of records containing asset information corresponding to confirmed assets may have been obtained. If the set of records was an empty set or if an examination of the set of records revealed that the first asset was not a member of the set, the system performing the process would have instead proceeded to 712 from 703. Consequently, at 704 the set of records containing asset information of confirmed assets may have already been obtained. Alternatively, rather than using a confirmation table, each transaction record in the transaction database corresponding to transactions performed by the user may be linked to or include asset information for confirmed assets for those transactions. Note that, in the context of FIG. 7, a "confirmed asset" may refer to an asset of which the user has proven ownership or has proven possession and control.

Next, the system may obtain a set of transactions that correspond to the confirmed assets obtained above. For example, a user may have input a telephone number as asset information when purchasing new shoes from an online merchant at a first time. At a second time, the user may have input an email address as asset information when purchasing a brand-new bag in another online purchase. An embodiment of the system of Appendix A, as previously described, may determine that the orders for the new shoes and brand-new bag are likely from the same user, and consequently assign the same user identifier to both transactions.

In this example, upon logging in with the telephone number to check the order status of the new shoes, the system performing the process 700 may confirm the mobile phone (first asset) corresponding to the telephone number. For example, the system may cause a short message service (SMS) message to be sent to the telephone number, or may utilize another method of confirmation, such as described below. Upon confirmation of the mobile phone, the system performing the process 700 may retrieve the transaction corresponding to the new shoes. However, the transaction corresponding to the brand-new bag may not be retrieved, because the asset associated with the brand-new bag transaction, the email account, has not yet been confirmed. At a time after the user also confirms the email account corresponding to the email address, if the user logs in using either the asset information of the telephone number or the email address, the system may retrieve both the transaction corresponding to the new shoes and the transaction corresponding to the brand-new bag. The details for the transactions may be displayed in an interface such as the invoice interface 500 of FIG. 5.

In 712, the system performing the process 700 may perform a confirmation workflow to confirm the asset corresponding to the asset information received in the login request of 702. As has been described in the present disclosure, the confirmation workflow may include sending a message to a location indicated by the asset information being confirmed. For example, the system may send a text message (e.g., an SMS message) to a device associated with a provided telephone number, or may send an email message to an email account/mailbox corresponding to a provided email address. A method by which the user can confirm receipt of the message, consumption of the message, and consent to associate the asset with the user identifier includes providing a unique code (e.g., a one-time password) in the message, and the user can input the unique code into a field of a webpage, submit the unique code from the webpage to the system performing the process 700, and the system can confirm that the received code matches the code that was sent. If the code does not match, the asset is not confirmed and the process 700 may be terminated and/or other security precautions may be executed by the system. In some cases, the unique code may be configured to expire after a certain amount of time, and in such cases, even if the unique code received does match the unique code sent, the asset may not be confirmed, as described above, because the unique code has expired. Similarly, a uniform resource locator may be embedded as a link in the message, and rather than requiring the user to manually enter a code into an interface, the message link may be clicked or otherwise activated by the user from the asset, which may cause a webpage to open and submit confirmation data to the system performing the process 700. As still another example, the system may place an automated voice call to a telephone associated with the telephone number, and automated voice call may provide an audio code (e.g., series of numbers and/or letters, one or more words, a phrase, etc.) to the user who answers the telephone, and the audio code may be entered in a similar manner as unique code provided in a text message. It is contemplated that other methods of confirming an asset, based on the provided asset information, are possible.

Once the asset has been confirmed, the system performing the process may store data indicating the confirmation of that asset. For example, the system may insert a record in the confirmation table that includes at least the user identity and the asset information that was just confirmed. As noted, in some implementations, the system may additionally insert information indicating the type of asset associated with the asset information and/or set a status flag indicating that the asset has been confirmed. Note that in other implementations where asset information and information indicating confirmation of assets are stored on a per transaction basis, the system at this stage may update corresponding transactions to indicate that assets have been confirmed. Thus, in either case, when a user logs in with asset information corresponding to any asset that has been confirmed for the user, the user may be provided access to details of all transactions that correspond to confirmed assets for that user.

In 710, the system performing the process 700 may determine whether there are additional unconfirmed assets (e.g., second assets) associated with the user identifier. This determination may be made by querying a transaction database for asset information (e.g., phone number, email address, etc.) provided with transactions that corresponded to the user (i.e., have been associated with the user identifier), but where the asset information provided with those transactions is not present within the set of asset information for confirmed assets, described above. As noted above, the actual determination and/or query may be performed by a separate system than the system performing the process 700. For example, the system performing the process 700 may be a web server and the determination and/or query may be performed by a backend server or service. Thus, it is contemplated that embodiments of the present disclosure may be implemented in a distributed computing environment. Thus, in the example above, after the user confirms control of the telephone associated with the telephone number, the system may determine, by performing a query of the transactions associated with the customer identifier, that the email address corresponding to the brand-new bag transaction has not been confirmed. In another example, expanding on the example above, after the user has confirmed the telephone number associated with the purchase of the new shoes, the user purchases a pair of cheap sunglasses in a third transaction. In this third transaction, the user provides a second email address, different from the first email address provided for the brand-new bag transaction, as asset information for this third transaction. If the user logs into the system of the present disclosure using the first email address (i.e., the one that corresponds to the brand-new bag transaction), in the operations of 710, the system may discover the second email address during the query of the transaction database for asset information corresponding to unconfirmed assets. In such cases, the system may proceed to 711, whereupon the system may provide the user with the ability to confirm an asset corresponding to the newly discovered asset information (i.e., the email address). As depicted in the invoice interface 500 of FIG. 5, this may include listing asset information associated with unconfirmed assets, and providing controls to the user that initiate the confirmation workflow of 712 for that asset. It is contemplated various other manners of providing users with the ability to confirm unconfirmed assets are possible.

In additional or alternative embodiments, a user may only be able to access details corresponding to transactions associated with assets that were confirmed during a particular login session. For example, at a first time, a user logs into the system of the present disclosure with first asset information and confirms assets associated with the first asset information (first asset) as well as assets associated with second and third asset information (second and third assets). At a second time, the user logs into the system of the present disclosure using fourth asset information and confirms the asset associated with the fourth asset information. However, because the fourth asset was not confirmed at the first time (e.g., the transaction corresponding to the fourth asset may have occurred after the transactions associated with the first, second, and third assets), and because none of the first, second, and third assets have been confirmed at the second time, the user may be unable to view the transactions associated with the first, second, and third assets (i.e., they are not yet linked together). However, at the second time, the user may be prompted (e.g., via a web interface) to confirm any of the first, second, and third assets, and upon confirming any of those assets, all four assets may be linked (e.g., stored in association with each other in a database), and the user may be able to view details from any of the first, second, third, and fourth assets. Likewise, if the user logs in at a third time using asset information associated with any of the first, second, or third assets, the user may be prompted to confirm the fourth asset, and, upon confirmation, the user may be able to view details from any of the first, second, third, and fourth assets (e.g., because they will all be linked together).

In short, until such time as the system performing the process 700 receives confirmation that the assets associated with one or more transactions are under the control of the user, the system may deny access to details of the associated one or more transactions. After the system receives acknowledgement (e.g., input of a matching confirmation code into a user interface, indication that the user has clicked on an appropriate link in a message sent to a location indicated by asset information, receiving a reply to a sent message, etc.) that the assets are under the control of the user, the system may update relevant database records to indicate that the assets have been confirmed for the user. In some implementations, the update to relevant database records may include updating one or more transaction tables, whereas in other implementations the update to relevant database records may include updating one or more asset confirmation tables separate from the transaction tables. In either case, the user may subsequently be provided access to details of the transactions associated with the newly-confirmed assets. In other words, as a result of storing the information indicating that the assets have been confirmed, the user may be enabled to view all transactions associated with any confirmed asset simply by logging in using one of confirmed assets.

Once an asset has been confirmed, if the user subsequently logs in using the associated asset information, that asset may not need to be reconfirmed. However, in some implementations, the system performing the process 700 may force the user to reconfirm assets on a periodic (e.g., once every three months) or stochastic basis for security purposes, or may force the user to reconfirm assets based on the occurrence of certain events or fulfillment of certain conditions (e.g., user logs in from an Internet protocol address that is not recognized by the system as being previously associated with the user, a number of failed login attempts exceed the threshold, etc.). Note further that one or more of the operations performed in 702-13 may be performed in various orders and combinations, including in parallel. Note also that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine (e.g., computer configured with processors that process the instructions), thereby causing the machine to perform the specified operations.

Embodiments of the disclosure can be described in view of the following clauses:

1. A computer-implemented method, comprising:
    under the control of one or more computer systems configured with executable instructions,
        receiving a plurality of field values generated based at least in part on first user input, the plurality of field values including a field value corresponding to a first asset associated with a user;
        performing a first workflow to verify control of the first asset by the user;
        selecting, from a plurality of transactions, a first set of transactions associated with both the user and the first asset;
        determining a second asset associated with the user;
        updating a user interface to present, simultaneously, first content representing the first set of transactions and second content representing the second asset associated with the user;
        receiving a selection of the second asset made via the updated user interface;
        performing a second workflow to verify control of the second asset by the user, the second workflow comprising:
            sending a message to a location associated with the second asset; and
            receiving information that verifies acknowledgement of receipt of the message; and
        contingent on receiving the information that verifies acknowledgment of receipt of the message:
            selecting, from the plurality of transactions, a second set of transactions associated with both the user and the second asset; and
                updating the user interface to present, simultaneously, the first content and second content representing the second set of transactions.

2. The computer-implemented method of clause 1, wherein:
    the plurality of field values is a first plurality of field values;
    the field value is a first field value;
    the method further comprising:
        receiving a second plurality of field values generated based at least in part second user input, the second plurality of field values including a second field value corresponding to either the first asset or the second asset;
        without performing any of the first workflow or the second workflow:

selecting from the plurality of transactions, the first set of transactions and the second set of transactions; and presenting content representing the first set of transactions and the second set of transactions in the user interface.

3. The computer-implemented method of clause 1 or 2, wherein the plurality of field values lack values for both username and password.

4. The computer-implemented method of any of clauses 1 to 3, further comprising, contingent on receiving the information that verifies acknowledgment of receipt of the message, updating a database storing the plurality of transactions such that one or more records in the database indirectly associating the first set of transactions with the second set of transaction by indicating confirmation of control by the user of both the first asset and the second asset.

5. A system, comprising:

one or more processors;

memory including instructions that, when executed by the one or more processors, cause the system to:

obtain a field value corresponding to a first asset associated with a user;

select, from a plurality of records, a first set of records associated with the user and the first asset;

determine a second asset associated with the user;

present a user interface that includes content representing the first set of records and an option to verify the second asset;

in response to receiving a selection of the option, perform a confirmation workflow to verify control of the second asset by the user; and as a result of successful execution of the confirmation workflow:

select, from the plurality of records, a second set of records associated with the user and the second asset; and update the user interface to include content representing the second set of records.

6. The system of clause 5, wherein the confirmation workflow includes:

causing an electronic message to be transmitted to one or more of an email account or a mobile device, wherein the electronic message includes a confirmation code;

receiving a code from a device via an interface to the system; and based at least in part on whether the code matches the confirmation code, outputting at least one value that indicates either the successful execution or an unsuccessful execution of the confirmation workflow.

7. The system of clause 5 or 6.

8. The system of any of clauses 5 to 7, wherein the instructions that cause the system to determine the second asset associated with the user further include instructions that cause the system to determine, based at least in part on a confidence score provided by a random forest, that the second set of records are associated with a same user as the first set of records.

9. The system of clauses 8, wherein the instructions further include instructions that cause the system to, as a result of the successful execution of the confirmation workflow, include the second set of records, using an identity of the user as a ground truth value, in a set of historical records used to train training the random forest.

10. The system of any of clauses 5 to 8, wherein the instructions further include instructions that cause the system to, in response to receiving an instruction to disassociate the first asset:

disassociate the first asset from the first set of records; and disassociate the first asset from the second set of records.

11. The system of clause 10, wherein the instructions further include instructions that cause the system to, as a result of receiving a request to access the first set of records or the second set of records, wherein the request includes a field value corresponding to the second asset:

select the first set of records and the second set of records from a plurality of records; and present the user interface that includes the content representing the first set of records and the second set of records.

12. The system of clause 10 or 11, wherein the instructions further include instructions that cause the system to, as a result of receiving a request to access the first set of records or the second set of records, wherein the request includes a field value corresponding to the disassociated first asset, blocking access to the first set of records and the second set of records.

13. A non-transitory computer-readable storage medium having stored thereon executable instructions that, when executed by one or more processors of a computer system, cause the computer system to at least:

obtain first asset information that corresponds to a first asset associated with a user;

determine a first set of records associated with the user and the first asset;

determine a second set of records associated with the user, the second set of records including second asset information corresponding to a second asset;

based at least in part on obtaining confirmation from the user that the second asset is under the control of the user:

associate both the first set of records and the second set of records with both the first asset information and the second asset information; and provide, to a computing device associated with the user, details about the first set of records and the second set of records.

14. The non-transitory computer-readable storage medium of clause 13, wherein:

the user is a current user;

the first asset is shared by a first user and a second user; and the instructions further include instructions that cause the computer system to:

obtain distinguishing information corresponding to the current user; and determine which of the first user or the second user is the current user based at least in part on the distinguishing information.

15. The non-transitory computer-readable storage medium of clause 13 or 14, wherein the instructions further include instructions that cause the computer system to determine from a database that the first asset has not been verified in association with the user;

attempt to verify that the first asset is under the control of the user by performing an asset confirmation workflow based at least in part on the first asset information; and based at least in part on successful verification of the first asset, indicate in the database that the first asset has been verified.

16. The non-transitory computer-readable storage medium of any of clauses 13 to 15, wherein the instructions include instructions that cause the computer system to:
determine whether confirmation has been obtained from the user that the second asset is under the control of the user; and
based at least in part on a determination that the confirmation has not been obtained, successfully perform a confirmation workflow to obtain the confirmation.

17. The non-transitory computer-readable storage medium of any of clauses 13 to 16, wherein the instructions further include instructions that cause the computer system to, based at least in part on obtaining denial from the user that the second asset is under the control of the user:
disassociate the second set of records from the first set of records; and
provide, to the user, details about the first set of records.

18. The non-transitory computer-readable storage medium of any of clauses 13 to 17, wherein the instructions that cause the computer system to determine the second set of records associated with the user include instructions that cause the computer system to determine, based at least in part on a confidence score exceeding a threshold, wherein the confidence score is produced by a random forest trained on a plurality of records, that the second set of records and the first set of records correspond to a same user.

19. The non-transitory computer-readable storage medium of clause 18, wherein:
each of the plurality of records include at least one record comprising a set of field values corresponding to a transaction, wherein the set of field values include a ground truth value corresponding to a user identity;
at least some of the field values of the second set of records include an identity of the user; and
the instructions further include instructions that cause the computer system to, based at least in part on obtaining confirmation from the user that the second asset is under the control of the user, retrain the random forest to include the at least some field values of the second set of records, wherein the identity of the user is the ground truth value.

20. The non-transitory computer-readable storage medium of clause 18 or 19, wherein:
each of the plurality of records include at least one record comprising a set of field values corresponding to a transaction, wherein the set of field values include a ground truth value corresponding to a user identity; and
the instructions further include instructions that cause the computer system to, based at least in part on obtaining denial from the user that the second asset is under the control of the user, retrain the random forest to exclude field values of the second set of records as having a ground truth value corresponding to an identity of the user.

Figure 8:
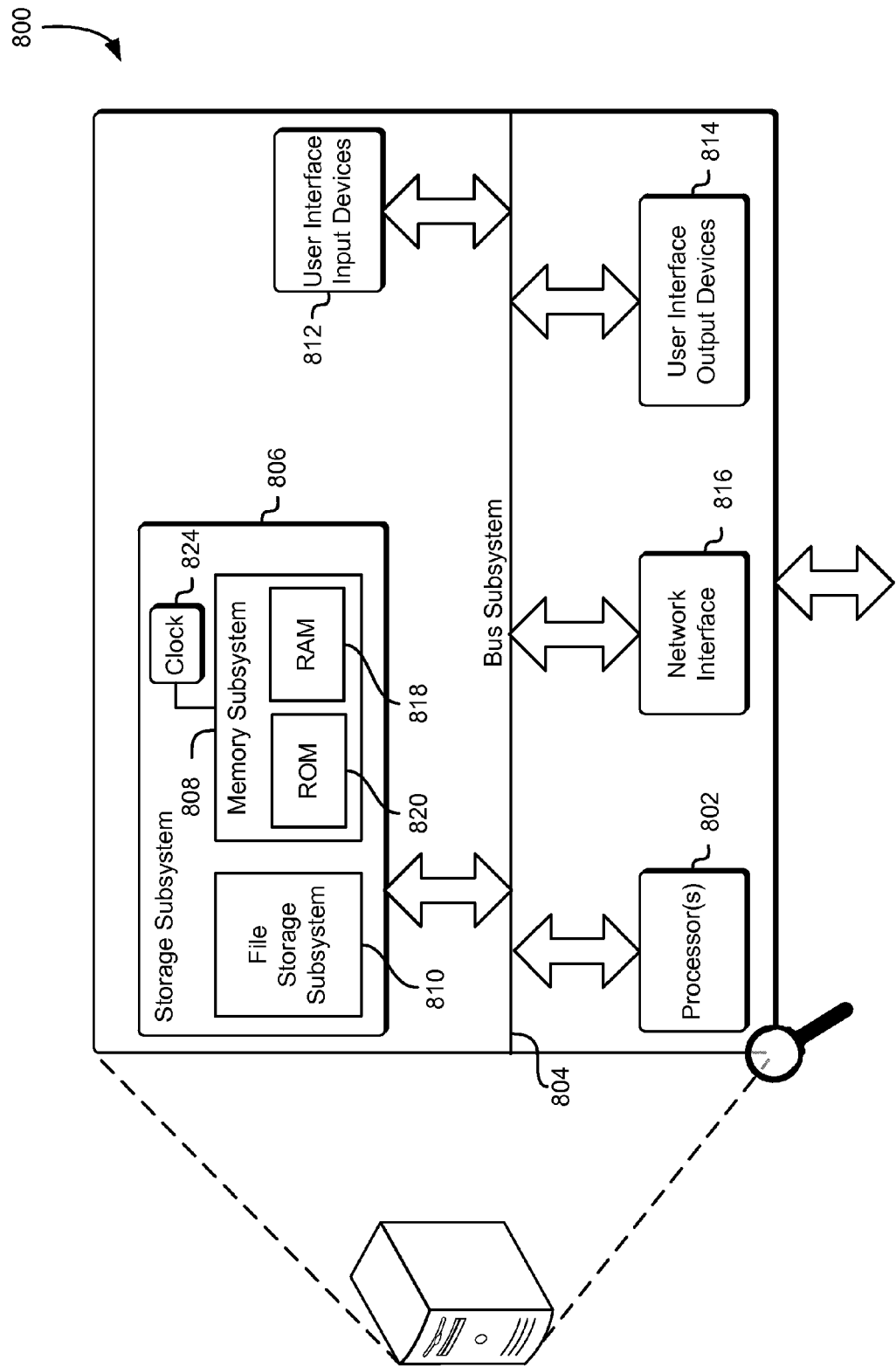
FIG. 8 illustrates an environment in which various embodiments can be implemented.

FIG. 8 is an illustrative, simplified block diagram of an example computing device 800 that may be used to practice at least one embodiment of the present disclosure. In various embodiments, the computing device 800 may be used to implement any of the systems illustrated herein and described above. For example, the computing device 800 may be configured for use as a data server, a web server, a portable computing device, a personal computer, or any electronic computing device. As shown in FIG. 8, the computing device 800 may include one or more processors 802 that may be configured to communicate with, and are operatively coupled to, a number of peripheral subsystems via a bus subsystem 804. The processors 802 may be utilized for the traversal of decision trees in random forest of supervised models in embodiments of the present disclosure (e.g., cause the evaluation of inverse document frequencies of various search terms, etc.). These peripheral subsystems may include a storage subsystem 806, comprising a memory subsystem 808 and a file storage subsystem 810, one or more user interface input devices 812, one or more user interface output devices 814, and a network interface subsystem 816. Such storage subsystem 806 may be used for temporary or long-term storage of information such as details associated with transactions described in the present disclosure, databases of historical records described in the present disclosure, and storage of decision rules of the supervised models in the present disclosure).

The bus subsystem 804 may provide a mechanism for enabling the various components and subsystems of computing device 800 to communicate with each other as intended. Although the bus subsystem 804 is shown schematically as a single bus, alternative embodiments of the bus subsystem may utilize multiple busses. The network interface subsystem 816 may provide an interface to other computing devices and networks. The network interface subsystem 816 may serve as an interface for receiving data from, and transmitting data to, other systems from the computing device 800. For example, the network interface subsystem 816 may enable a data technician to connect the device to a wireless network such that the data technician may be able to transmit and receive data while in a remote location, such as a user data center. The bus subsystem 804 may be utilized for communicating data, such as details, search terms, and so on to the supervised model of the present disclosure, and may be utilized for communicating the output of the supervised model to the one or more processors 802 and to merchants and/or creditors via the network interface subsystem 816.

The user interface input devices 812 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 800. The one or more user interface output devices 814 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. The one or more output devices 814 may be used, for example, to present user interfaces to facilitate user interaction with applications performing processes described herein and variations therein, when such interaction may be appropriate.

The storage subsystem 806 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The memory subsystem 808 may include a number of memories, including a main random access memory (RAM) 818 for storage of instructions and data during program execution and a read only memory (ROM) 820 in which fixed instructions may be stored. The file storage subsystem 810 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The computing device 800 may include at least one local clock 824. The local clock 824 may be a counter that represents the number of ticks that have transpired from a particular starting date and may be located integrally within the computing device 800. The local clock 824 may be used to synchronize data transfers in the processors for the computing device 800 and all of the subsystems included therein at specific clock pulses and may be used to coordinate synchronous operations between the computing device 800 and other systems in a data center. In one embodiment, the local clock 824 is an atomic clock. In another embodiment, the local clock is a programmable interval timer.

The computing device 800 may be of various types, including a portable computer device, tablet computer, a workstation, or any other device described below. Additionally, the computing device 800 may include another device that may be connected to the computing device 800 through one or more ports (e.g., USB, a headphone jack, Lightning connector, etc.). The device that may be connected to the computing device 800 may include a plurality of ports configured to accept fiber-optic connectors. Accordingly, this device may be configured to convert optical signals to electrical signals that may be transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems that execute instructions,
receiving a plurality of field values generated based at least in part on first user input, the plurality of field values including a field value corresponding to a first asset associated with a user;
performing a first workflow to verify control of the first asset by the user;
selecting, from a plurality of transactions, a first set of transactions associated with both the user and the first asset;
dynamically determining that a second set of transactions, which is unassociated with the first asset, is associated with the user by:
computing a confidence score, based at least in part on details about the first set of transactions, that indicates a likelihood that the second set of transactions is also associated with the user that is associated with the first set of transactions, the first set of transactions being unassociated with a second asset that is associated with the second set of transactions; and
determining that the confidence score is above a threshold probability of being associated with the user;
updating a user interface to form an updated user interface that presents, simultaneously, first content representing the first set of transactions and second content representing the second asset associated with the user;
receiving a selection of the second asset made via the updated user interface;
performing a second workflow to verify control of the second asset by the user, the second workflow comprising:
sending a message to a location associated with the second asset; and
receiving information that verifies acknowledgement of receipt of the message; and
contingent on receiving the information that verifies acknowledgment of receipt of the message:
selecting, from the plurality of transactions, the second set of transactions associated with both the user and the second asset; and
updating the user interface to present, simultaneously, the first content and second content representing the second set of transactions.

2. The computer-implemented method of claim 1, wherein:
the plurality of field values is a first plurality of field values;
the field value is a first field value; and
the method further comprises:
receiving a second plurality of field values generated based at least in part on a second user input, the second plurality of field values including a second field value corresponding to either the first asset or the second asset; and
without performing any of the first workflow or the second workflow:
selecting from the plurality of transactions, the first set of transactions and the second set of transactions; and
presenting content representing the first set of transactions and the second set of transactions in the user interface.

3. The computer-implemented method of claim 1, wherein the plurality of field values lack values for both username and password.

4. The computer-implemented method of claim 1, further comprising, contingent on receiving the information that verifies acknowledgment of receipt of the message, updating a database storing the plurality of transactions such that one or more records in the database indirectly associating the first set of transactions with the second set of transactions by indicating confirmation of control by the user of both the first asset and the second asset.

5. A system, comprising:
one or more processors; and
memory including instructions that, as a result of execution by the one or more processors, cause the system to:
obtain a field value corresponding to a first asset associated with a user;
select, from a plurality of records, a first set of records associated with the user and the first asset;
dynamically determine that a second set of records, which is unassociated with the first asset, is associated with the user by causing the system to:
compute a confidence score, based at least in part on details about the first set of records, that indicates a likelihood that the second set of records is also associated with the user that is associated with the first set of records, the first set of records being unassociated with a second asset that is associated with the second set of records; and
determine that the confidence score is above a threshold probability of being associated with the user;
present a user interface that includes content representing the first set of records and an option to verify the second asset;
in response to receiving a selection of the option, perform a confirmation workflow to verify control of the second asset by the user that includes:
sending a message to a location associated with the second asset; and
receiving confirmation of receipt of the message; and
as a result of successful execution of the confirmation workflow:
select, from the plurality of records, a second set of records associated with the user and the second asset; and
update the user interface to include content representing the second set of records.

6. The system of claim 5, wherein:
sending the message comprises causing an electronic message to be transmitted to one or more of an email account or a mobile device, wherein the electronic message includes a confirmation code;
receiving the confirmation comprises receiving a code from a device via an interface to the system; and
the confirmation workflow further includes, depending at least in part on whether the code matches the confirmation code, outputting at least one value that indicates either the successful execution or an unsuccessful execution of the confirmation workflow.

7. The system of claim 5, wherein instructions further include instructions that cause the system to, as a result of successful execution of the confirmation workflow:
update an association of the first set of records to include the second asset; and
update an association of the second set of records to include the first asset.

8. The system of claim 5, wherein the instructions that cause the system to determine the second asset associated with the user further include instructions that cause the system to determine, based at least in part on a confidence score provided by a random forest, that the second set of records is associated with a same user as the first set of records.

9. The system of claim 8, wherein the instructions further include instructions that cause the system to, as a result of the successful execution of the confirmation workflow, include the second set of records, using an identity of the user as a ground truth value, in a set of historical records used to train training the random forest.

10. The system of claim 5, wherein the instructions further include instructions that cause the system to, in response to receiving an instruction to disassociate the first asset:
disassociate the first asset from the first set of records; and
disassociate the first asset from the second set of records.

11. The system of claim 10, wherein the instructions further include instructions that cause the system to, as a result of receiving a request to access the first set of records or the second set of records, wherein the request includes a field value corresponding to the second asset:
select the first set of records and the second set of records from a plurality of records; and
present the user interface that includes the content representing the first set of records and the second set of records.

12. The system of claim 10, wherein the instructions further include instructions that cause the system to, as a result of receiving a request to access the first set of records or the second set of records, and the request includes a field value corresponding to the disassociated first asset, block access to the first set of records and the second set of records.

13. A non-transitory computer-readable storage medium having stored thereon executable instructions that, as a result of execution by one or more processors of a computer system, cause the computer system to at least:
obtain first asset information that corresponds to a first asset associated with a user;
determine a first set of records associated with the user and the first asset;
dynamically determine, that a second set of records, which is unassociated with the first asset, is associated with the user by causing the computer system to:
compute a confidence score, based at least in part on details about the first set of records, that indicates a likelihood that the second set of records is also associated with the user that is associated with the first set of records, the first set of records being unassociated with a second asset that is associated with the second set of records; and
determine that the confidence score is above a threshold probability of being associated with the user;
update a user interface to form an updated user interface that presents:
content representing the first set of records and the second asset; and
an option to verify the second asset;
receive a selection of the option made via the updated user interface;
perform a workflow to verify control of the second asset by the user, the workflow comprising:
sending a message to a location associated with the second asset; and
receiving confirmation of receipt of the message; and
based at least in part on obtaining confirmation from the user that the second asset is under control of the user:
associate both the first set of records and the second set of records with both the first asset information and second asset information corresponding to the second asset; and
provide, to a computing device associated with the user, details about the first set of records and the second set of records.

14. The non-transitory computer-readable storage medium of claim 13, wherein:
the user is a current user;
the first asset is shared by a first user and a second user; and
the executable instructions further include instructions that cause the computer system to:
obtain distinguishing information corresponding to the current user; and
determine which of the first user or the second user is the current user based at least in part on the distinguishing information.

15. The non-transitory computer-readable storage medium of claim 13, wherein the executable instructions further include instructions that cause the computer system to:
determine from a database that the first asset has not been verified in association with the user;
attempt to verify that the first asset is under the control of the user by performing an asset confirmation workflow based at least in part on the first asset information; and
based at least in part on successful verification of the first asset, indicate in the database that the first asset has been verified.

16. The non-transitory computer-readable storage medium of claim 13, wherein the executable instructions include instructions that cause the computer system to:
determine whether the confirmation has been obtained from the user, the confirmation indicating that the second asset is under the control of the user; and
based at least in part on a determination that the confirmation has not been obtained, successfully perform a confirmation workflow to obtain the confirmation.

17. The non-transitory computer-readable storage medium of claim 13, wherein the executable instructions further include instructions that cause the computer system to, based at least in part on obtaining denial from the user that the second asset is under the control of the user:
disassociate the second set of records from the first set of records; and
provide, to the user, details about the first set of records.

18. The non-transitory computer-readable storage medium of claim 13, wherein the executable instructions that cause the computer system to determine the second set of records associated with the user include instructions that cause the computer system to determine, based at least in part on a confidence score exceeding a threshold, wherein the confidence score is produced by a random forest trained on a plurality of records, that the second set of records and the first set of records correspond to a same user.

19. The non-transitory computer-readable storage medium of claim 18, wherein:
   each of the plurality of records include at least one record comprising a set of field values corresponding to a transaction, wherein the set of field values includes a ground truth value corresponding to a user identity;
   at least some of the field values of the second set of records include an identity of the user; and
   the instructions further include instructions that cause the computer system to, based at least in part on obtaining confirmation from the user that the second asset is under the control of the user, retrain the random forest to include the at least some of the field values of the second set of records, wherein the identity of the user is the ground truth value.

20. The non-transitory computer-readable storage medium of claim 18, wherein:
   each of the plurality of records include at least one record comprising a set of field values corresponding to a transaction, wherein the set of field values includes a ground truth value corresponding to a user identity; and
   the instructions further include instructions that cause the computer system to, based at least in part on obtaining denial from the user that the second asset is under the control of the user, retrain the random forest to exclude field values of the second set of records as having a ground truth value corresponding to an identity of the user.

* * * * *